(12) United States Patent
Amir et al.

(10) Patent No.: US 8,560,462 B2
(45) Date of Patent: Oct. 15, 2013

(54) MANAGEMENT OF USAGE COSTS OF A RESOURCE

(75) Inventors: Arnon Amir, Saratoga, CA (US); Myron Dale Flickner, San Jose, CA (US); Douglas Warren McDavid, Elk Grove, CA (US); James Clinton Spohrer, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 1882 days.

(21) Appl. No.: 11/185,642

(22) Filed: Jul. 20, 2005

(65) Prior Publication Data

US 2007/0021968 A1 Jan. 25, 2007

(51) Int. Cl.
*G06F 17/00* (2006.01)
*G06G 7/00* (2006.01)
*G06Q 10/00* (2012.01)

(52) U.S. Cl.
USPC ............ 705/400; 705/1.1; 705/7.12; 705/302

(58) Field of Classification Search
None
See application file for complete search history.

(56) References Cited

U.S. PATENT DOCUMENTS

| | | | | |
|---|---|---|---|---|
| 5,642,279 | A * | 6/1997 | Bloomberg et al. | ............ 705/14 |
| 5,808,908 | A | 9/1998 | Ghahramani | |
| 6,047,261 | A | 4/2000 | Siefert | |
| 6,185,514 | B1 | 2/2001 | Skinner et al. | |
| 6,260,024 | B1 * | 7/2001 | Shkedy | ............ 705/37 |
| 6,343,271 | B1 * | 1/2002 | Peterson et al. | ............ 705/4 |
| 6,885,877 | B1 * | 4/2005 | Ozaki et al. | ............ 455/556.1 |
| 6,895,382 | B1 * | 5/2005 | Srinivasan et al. | ............ 705/7 |
| 2002/0026589 | A1 | 2/2002 | Fukasawa | |
| 2002/0038366 | A1 | 3/2002 | Harasawa | |
| 2002/0198995 | A1 | 12/2002 | Liu et al. | |
| 2003/0112933 | A1 | 6/2003 | Snelgrove | |
| 2003/0120539 | A1 | 6/2003 | Kourim et al. | |
| 2003/0149674 | A1 * | 8/2003 | Good et al. | ............ 705/402 |
| 2003/0167180 | A1 | 9/2003 | Chung et al. | |
| 2004/0064247 | A1 * | 4/2004 | Davis | ............ 701/201 |
| 2004/0226993 | A1 * | 11/2004 | Fulcher et al. | ............ 235/381 |

OTHER PUBLICATIONS

Cheng, H. K. and G. J. Koehler (2003). "Optimal pricing policies of web-enabled application services." Decision Support Systems 35(3): 259-272.*
Gehrig et al., Differntiation Induced Switching costs and Poaching, Journal of Economics and Management Strategy, vol. 13, No. 4, Winter 2004, 635-655.*

(Continued)

*Primary Examiner* — George Chen
(74) *Attorney, Agent, or Firm* — Schmeiser, Olsen & Watts LLP; Daniel E. Johnson

(57) ABSTRACT

A method for managing a usage cost of an asset. A user component of a business entity may access the asset after the asset has been developed by a development component of the business entity, wherein the user component receives compensation from a compensator in response to the user component having incurred a usage burden from using the asset, and wherein the compensator may have contributed to the usage burden. Alternatively, a user component of a second business entity may access an asset after the asset is developed by a development component of a first business entity, wherein second business entity receives compensation from the first business entity in response to the user component having incurred a usage burden from using the asset. The compensation has a magnitude that is a function of the usage burden. The asset may be a software application.

33 Claims, 18 Drawing Sheets

(56) References Cited

OTHER PUBLICATIONS

Meredith Little, When should consultants buy professional liability insurance?, http://www.techrepublic.com/article/when-should-consultants-buy-professional-liability-insurance/1038990, Feb. 19, 2002.*

Sanghoon Ahn, Technology Upgrading with learning cost, working papers—organization for economic cooperation and development economics department, issue 220, p. 1-6 1999.*

* cited by examiner

MANAGEMENT OF USAGE COSTS OF A RESOURCE

BACKGROUND OF THE INVENTION

1. Technical Field

The present invention relates generally to management of a resource and more particularly to management of costs incurred from usage of the resource.

2. Related Art

In recent years, a trend of introducing new on-line software applications to assist in different tasks has expanded extensively. In spite of an intent of these applications to improve employee productivity, it often turns out that work relating to these applications shifts from one group of employees to another group, which is part of a shift from administrative specialists to distributed administration. With employees facing an ever increasing number of applications to handle, a need to learn and use so many applications adversely affects some employees' productivity in their main job. There is a trend of de-centralizing tasks from being performed by specialists who assist the other employees to being performed by the employees themselves, and the trade-off relating to this trend is buried so deep in the current way of conducting business that it is barely noticeable, thus dragging a change in one direction without any balance of the impact on overall corporate performance. Although there are apparent cost savings when viewed from the point of view of one organization, these apparent cost savings are in actuality no more than cost shifts.

Accordingly, there is a need to improve employer productivity in conjunction with software application work projects.

SUMMARY OF THE INVENTION

The present invention provides a method for managing a usage cost of a resource, said method comprising:

accessing the resource by a user component of a business entity after an asset has been developed by a development component of the business entity, wherein the resource consists essentially of the asset or both the asset and a service, wherein the service supports usage of the asset and is provided by a service provider, and wherein if the resource consists essentially of the asset and the service then said accessing comprises accessing the service from the service provider; and receiving compensation by the user component from at least one compensator in response to the user component having incurred a usage burden from using the resource, wherein the usage burden is an expense of using the resource in excess of an expense of using a predetermined reference resource, wherein the compensation has a magnitude that is a function of the usage burden, and wherein the at least one compensator comprises at least one of: (1) a component of the business entity and (2) the service provider if the resource consists essentially of the asset and the service.

The present invention provides a method for managing a usage cost of a resource, said method comprising:

accessing the resource by a user component of a first business entity after the asset has been developed by a development component of a second business entity, wherein the resource consists essentially of the asset or both the asset and a service, wherein the service supports usage of the asset and is provided by a service provider, and wherein if the resource consists essentially of the asset and the service then said accessing comprises accessing the service from the service provider; and receiving compensation by the first business entity from the second business entity in response to the user component having incurred a usage burden from using the resource, wherein the usage burden is an expense of using the resource in excess of an expense of using a predetermined reference resource, and wherein the compensation has a magnitude that is a function of the usage burden.

The present invention provides a method for managing a usage cost of a resource, said method comprising:

providing access, by a second business entity, of the resource to a user component of a first business entity after the asset has been developed by a development component of the second business entity, wherein the resource consists essentially of the asset or both the asset and a service, wherein the service supports usage of the asset and is provided by a service provider comprised by the second business entity, and wherein if the resource consists essentially of the asset and the service then said providing access comprises providing access to the service by the service provider; and providing compensation to the first business entity from the second business entity in response to the user component having incurred a usage burden from using the resource, wherein the usage burden is an expense of using the resource in excess of an expense of using a predetermined reference resource, and wherein the compensation has a magnitude that is a function of the usage burden.

The present invention provides a method comprising receiving compensation by a user of a software application in response to the user having incurred a usage burden from using the software application, said compensation being received from a party that contributed to the usage burden, said usage burden being determined by a metric previously agreed upon by the user and the party.

The present invention provides a method comprising providing compensation to a user of a software application in response to the user having incurred a usage burden from using the software application, said compensation being provided by a party that contributed to the usage burden, said usage burden being determined by a metric previously agreed upon by the user and the party The present invention provides a method and system for improving employer productivity in conjunction with software application work projects.

DETAILED DESCRIPTION OF THE INVENTION

Figure 1:
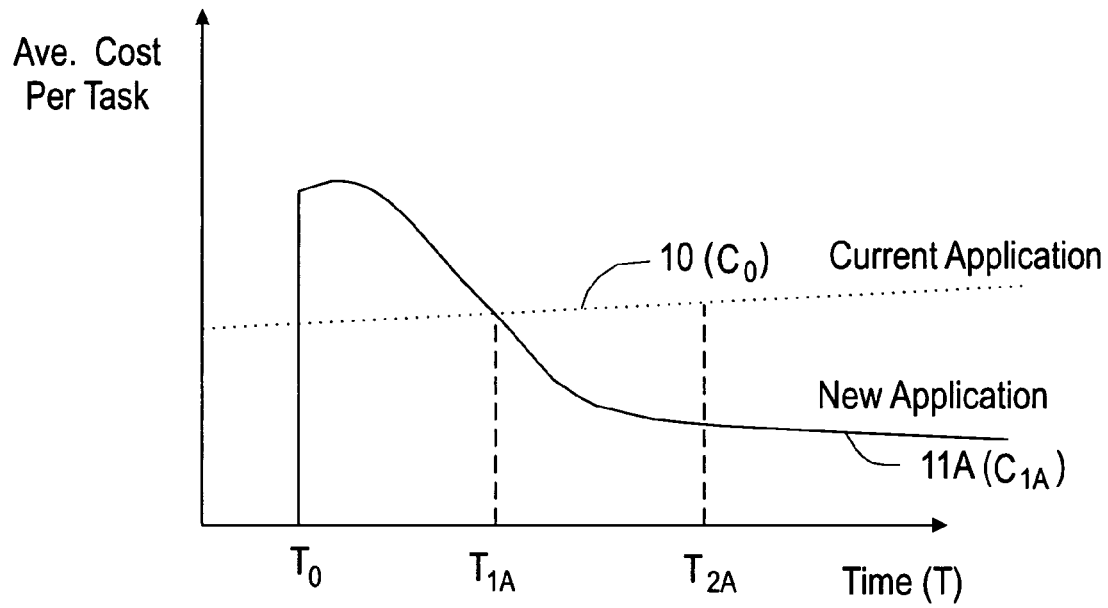
FIGS. 1-2 are graphs illustrating cost saving resulting from replacement of a current software application by a new software application, in accordance with embodiments of the present invention.
Figure 2:
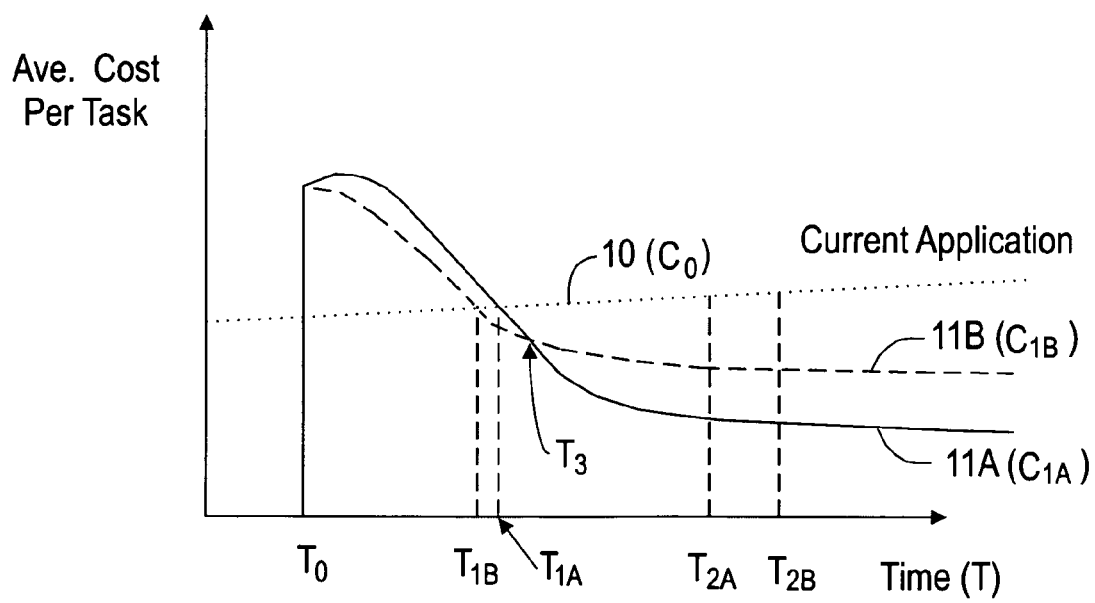

FIGS. 1-2 are graphs illustrating cost saving resulting from replacement of a current software application 10 by a new software application 11A or 11B, in accordance with embodiments of the present invention.

FIG. 1 depicts the average cost per task per unit time ($C_0$) as a function of time for the current application 40 under the assumption that the current application continues to be used and is not being replaced. FIG. 1 also depicts the average cost per task per unit time ($C_{1A}$) as a function of time for the new application 11A that is launched at time $T_0$ and replaces the current application 10. Initially just after time $T_0$, cost $C_{1A}$ is significantly greater than cost $C_0$, because there are development costs associated with the launching of the new application 11A (e.g, software generation costs, software migration and installation costs, user training costs, initial software debugging costs, etc.). However, the new application 11A is more efficient than the current application 10. Thus, as $C_{1A}$ decreases with increasing time, $C_{1A}$ eventually becomes equal to $C_0$ at time $T_{1A}$ and is less than $C_0$ at times greater than $T_{1A}$. The time $T_{2A}$ denotes the time after which the time-integrated cost of the new application 11A ($\int C_{1A}(t)dt$ from $T_0$ to $T>T_{2A}$) is less than the time-integrated cost of the current application 10 ($\int C_0(t)dt$ from $T_0$ to $T>T_{2A}$). Therefore, an elapse of time of $T_{2A}-T_0$ must occur following launch of the new application 11A at time $T_0$ before the total amount of money spent is less for the new application 11A than for the current application 10.

FIG. 2 depicts FIG. 1 with an addition of the new software application 11B. The new application 11B is the same application as the new application 11A, except that less money is expended to support the initial development of the new application 11B than is expended to support the initial development of the new application 11A, resulting in the average cost per task per unit time ($C_{1B}$) for the new application 11B being equal to the average cost per task per unit time $C_o$ of the old application 10 at an earlier time ($T_{1B}$) than the corresponding time $T_{1A}$ for the new application 11A. The preceding information might lead one to the conclusion that the new application 11B is more cost effective than the application 11A. Such a conclusion is incorrect, however, because the lesser amount of money initially spent to support the new application 11B, in comparison with the relatively greater amount of money initially spent to support the new application 11A, has resulted in a higher cost per task (at a time $T_{2B}$) with the consequence that the time-integrated cost of the new application 11B ($\int C_{1B}(t)dt$ from $T_0$ to $T_{2B}$) is equal to the time-integrated cost of $C_0$ ($\int C_0(t)dt$ from $T_0$ to $T_{2B}$) at a time $T_{2B}$ that exceeds the corresponding time $T_{2A}$ for the new application 11A. Therefore, the reduction in the initial funds for developing application 11B, relative to the initial funds for developing application 11A, did not save money but instead cost money in the long run.

An optimal amount of money to spend for developing an application may be determined as follows. Assume that an organization has spent $X to develop an application, $M per year on maintenance, and $Y annually per employee for using the application. The cost of the application after K years, with N employees using the application, is $X+K*M+K*N*Y$. Assume that an additional expenditure dX for development would save dY per year in usage cost. Then, the additional expenditure of dX may be justified if the total cost C decreases as a result, wherein $C=(X+dX)+K*M+K*N*(Y-dY)$. Alternatively, a decrease in the development cost (i.e., $dX<0$) may reduce C. Whether dX must be increased or decreased to reduce C is case dependent. An optimal dX minimizes the total cost C. The value of dX that minimizes C is a function of K, taking into account the time dependence of M and Y in the time interval between times 0 and K as in FIGS. 1 and 2.

For certain applications, a web-based tool used by all the employees on an occasional basis may be more costly than a centralized service operated by experts on a regular basis. Examples are travel reservations, purchasing, reimbursement applications, where a complicated process or application requires a long learning curve, but infrequent personal usage makes most users novices to the system, and they spend a lot of time without getting the best results. In some of those examples, not only is the time spent much longer by a novice user, but also there might be a direct expense associated with the transaction which could have been reduced had the transaction been made by an expert on behalf of the employee.

Consider a corporation with several components (e.g., divisions, branches, organizations, etc.), wherein component X of the corporation is a software development component that has developed an on-line software application for use by other components of the corporation (e.g., over the Intranet). A service provided by service provider Y (e.g., an on-line help desk) assists employees of the other components with using the application for performing a task. Service provider Y could be within the corporation (e.g., another component of the corporation), or exist outside of the corporation. However, there is no direct incentive for component X to make its on-line application effective to its users or for service provider Y to provide the service in a manner that minimizes user time, since the user's time is not being charged to X or to Y. Rather, component X and service provider Y may each attempt to minimize its own cost and thus maximize its own benefit from the application, by passing as much of the work load as possible to the other components of the corporation. Component X reports the saving in its own costs due to introducing the application and the corporation pays the overall, unknown cost, as does the service provider Y if the service provider Y is a component of the corporation. If the service provider Y is not comprised by the corporation, then the service provider Y simply pockets the savings in cost from providing a low level of service as extra profit. In any event, the extra time that the user has spent in using the application attributable to the less than perfect application developed by component X and/or the less than perfect level of service provided by the service provider Y is a detriment to the corporation's finances.

The present invention solves the preceding problem for the corporation by having component X and/or service provider Y pay compensation for the "usage burden" incurred by users of the application. The "usage burden" is a monetary equivalent of the amount of "extra time" spent by users in using the application, as compared with the time that would have been spent by the users had the application and its supporting services been provided to the users in accordance with a predetermined metric. A determination of the "extra time" may be effectuated by time monitoring mechanisms as will be discussed infra. A determination of the "compensation" and the parties contributing to the compensation and the proportionality of the compensation provided by each contributing party will be discussed infra.

In the preceding example, component X will pay for the extra time employees of other components spend on using the application provided by component X. The more extra time it takes to perform a task using the application, the more that component X has to pay. This payment may take any form, such as a reduction in payment to component X from other components using the application. Similar considerations apply to the service provider Y. Thus, the present invention provides both component X and service provider Y an incentive to improve their performance in reducing usage time for the application, which reduces the overall cost to the corporation. With the present invention, the overall cost to the corporation of funding component X includes the real cost of using the application to perform tasks across the corporation, rather than only the application's direct expenses of labor, equipment etc. As a result, the corporation experiences overall cost reductions and not just cost shifting. In one embodiment, the corporation may place more emphasis in achieving said cost reductions for applications that are used more frequently at high volume than for applications that are used rarely or infrequently.

The usage burden not need be directly compensated by an actual payment. For example, if a metric for usage burden comprises a task usage 10±2 minutes for users, then there is no usage burden if the usage time is between 8 to 12 minutes per task, with a usage burden being activated if the usage time exceeds 12 minutes. In some embodiments, there may be a defined "negative usage burden" (e.g., if the usage time is less than 8 minutes in this example), wherein the contributor(s) to the negative usage burden might receive a reward or bonus for performing better than expected. A purpose of the metric is to set expectations for the application developers, application service providers, and application users as to what the expected usage time is for using the application in performing various tasks.

Compensation for the usage burden may be accomplished in different ways such as, inter alia, from component X to other components, or from component X to the corporation. However it may be the responsibility of Component X to fund this cost, at least in part. The charge per employee's time may be the actual cost or only a fraction of the actual cost. The employee's time may be technically measured or estimated in different ways.

When a new application is rolled out to replace a current application, there may be a one-time ramp-up cost in learning the tool by users, which may take several uses of the tool, and there is also an on-going tool usage cost which may likewise involve a learning curve by users. The current application has some usage time as well. The compensation for usage burden have various characteristics, such as no compensation if the usage time for the new application is less than the usage time of current old method.

In one embodiment, the component X is charged to pay compensation only when the application fails or changes, causing the user to spend excess time. For example, it is possible to spend four times the normal time in creating an on-line travel reservation due to the fact that the templates may have changed, or some part of the system is down. The burdened user may be able to submit a problem ticket with the errors and claim the re-entry time. The cost may be paid to the corporate account or be reimbursed based on the employee component (e.g., using employee's serial number). This provides a strong incentive for the application develop and/or service provider to fix problems quickly.

In one embodiment, the compensation is paid as funny money, wherein no real dollars are transferred, but the information is used in the performance appraisal of the corporate component providing the application and/or service.

To determine application usage time, any tracking, logs or dedicated data collection method could be used to measure or estimate the amount of time the application is being used, the number of transactions, and the average transaction time. One such method is described in U.S. patent application Ser. No. 10/952,414, filed Sep. 29, 2004, A. Amir et al., entitled "Grammar-Based Task Analysis of Web Logs", hereby incorporated by reference in its entirety. In Ser. No. 10/952,414, an analysis of web access logs is applied to detect tasks being performed and to associate those tasks with relevant metadata such as the task duration, employee name, geography, division etc. Other applicable tools for determining application usage time are SurfAid (Surfaid analytics, on Internet website identified by the concatenation of "http://" and "surfaid.dfw.ibm.com"), and other commercial tools for web log analysis. The monitoring/tracking tools for tracking application usage time may be implemented within the application itself. The application usage time could be estimated by conducting user studies, questionnaires, video monitoring, or other means. Any mechanism for gathering or inferring the application usage time is within the scope of the present invention.

The monetary equivalent of time that employees spend in using an application may vary depending on job, title, geography, and individual basis. The basic hourly employee salary may be used, such as from the employee's information collected from a payroll database or by average hourly employee salary based on slices of the employee population. The cost associated with the use of an application may be the real hourly rate, but it may alternatively be a rate agreed upon as part of a contract or other agreement, or any other rate.

In one embodiment, a contract for an on demand service includes an Internet-based application. The application may include software that is responsible for logging all the usage time of each session. The logs are then processed and the actual time to perform tasks is computed. The number of tasks, task type, etc. may also be computed. Based on these logs, the amount of time spent on the application is computed. This amount of time spent is compared against the metric (e.g., as encoded within a corporate policy, in a terms of a service license or contract between the corporation and a service provider not comprised by the corporation). The results of the comparison determines whether a usage burden has been incurred by application users, and if a usage burden has incurred, a compensation amount, who is to pay the compensation, who is to receive the compensation, etc. is determined according to a predetermined formula, algorithm, agreement, etc.

The following definitions apply to the present invention.

An "asset" comprises an item of value. Assets include, but are not limited to, "goods" that may be trademarked by the United States Patent and Trademark Office. Examples of assets include, inter alia, computer software, computer hardware, machinery, commodities, chemicals, tools, materials, utensils, instruments, games, food products, etc.

A "service" comprises an act that is performed by a first party (or parties) for the benefit of a second party (or parties). Services include, but are not limited to, "services" that may be servicemarked by the United States Patent and Trademark Office. Examples of services include, inter alia, installing software in a computer system of a client, providing consultation to users of computer software (e.g., an on-line help desk), building a boat for a customer, serving food to a customer in a restaurant, playing a musical work for the benefit of a listener, etc.

A "resource" comprises at least one asset and/or at least one service.

A "usage burden" in relation to a resource is an "extra cost" to a user of the resource, as measured by a specified metric. A usage burden may be determined by comparing the cost of using the resource with the cost of using a predetermined reference resource, wherein the usage burden is an expense of using the resource in excess of an expense of using the predetermined reference resource. The predetermined reference resource may be specified and/or agreed to by one or more of the affected parties via a policy, a contract or other agreement, a directive such as from a corporate executive, etc. Using the example of FIGS. 1 and 2 for illustrative purposes, the resource is the new application 11A or 11B, and the predetermined reference resource is the current application 10.

The usage burden may be a function of the "extra time" spent in using the resource as measured by a metric. Thus, the extra time may be determined by comparing the cost of using the resource with the time of using a predetermined reference resource, wherein the extra time is the time in excess of the time of using the predetermined reference resource. Then the extra time is converted into units of cost (e.g., dollars) by appropriate conversion factors (e.g., the market value of the extra time spent in consideration of the type of work performed during the extra time, or by predetermined conversion factors such as conversion factors specified by contract or other agreement, policy, executive directive, etc.).

A "financial value" may be a monetary value or an equivalent thereof (e.g., an asset whose market value is the monetary value), a credit, withdrawal of a debit, "funny money" which is a bookkeeping entry of a credit or debit wherein no funds are actually transferred, etc.

A "compensation" for a usage burden comprises a financial value actually or constructively received by at least one first party from at least one second party, in response to the usage burden having been incurred by the at least one first party, a portion thereof, or a third party in accordance with a relationship and/or agreement with the at least one first party and/or at least one second party. "Funny money" credited to a designated party by a bookkeeping entry is an example of compensation constructively received by the designated party. The compensation has a magnitude that is a function of the usage burden.

A "business entity" is any form of business organization such as sole proprietorship, general partnership, limited partnership, corporation, limited liability company, limited liability partnership, and a business combination. Examples of business combinations include: mergers, joint venture, consolidation, acquisition, strategic alliance, association, etc.

A "component" of a business entity is any organizational unit within the business entity (e.g. division, subdivision, branch, organization, unit, subunit, etc.). A component of a business entity may comprise a plurality of individuals or a single individual.

A "transfer path" of X from a party A to a party B may be a physical path from A to B or an abstract transfer path from A to B such as may be accomplished by changing bookkeeping in accounts of A and B, wherein X designates what is transferred (e.g., financial value, asset, service, compensation, etc.)

FIGS. 3-11 are block diagrams depicting, within a business entity, flow of a resource, funds, and compensation, said compensation being in response to a usage burden incurred from using the resource, in accordance with embodiments of the present invention.

Figure 3:
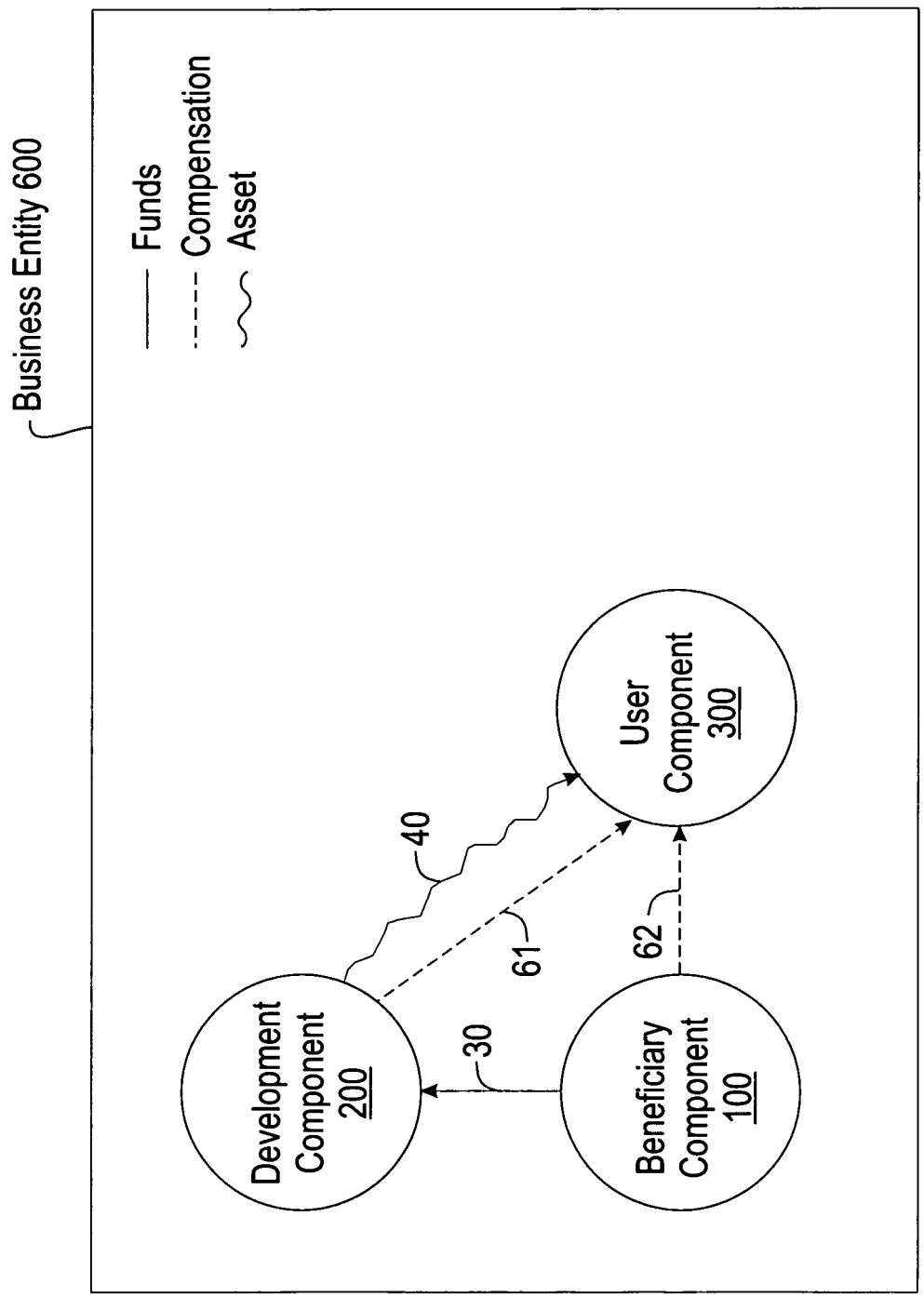
FIGS. 3-11 are block diagrams depicting, within a business entity, flow of a resource, funds, and compensation, said compensation being in response to a usage burden incurred from using the resource, in accordance with embodiments of the present invention.

FIG. 3 depicts a business entity 600 comprising a beneficiary component 100, a development component 200, and a user component 300. The beneficiary component 100 may transfer financial value via transfer path 30 to the development component 200 to develop an asset for usage by the user component 300. Alternatively, the development component 200 may develop the asset in an absence of the transfer of financial value from the beneficiary component 100 to the development component 200.

After the development component 200 develops the asset, the user component 300 is provided access to the asset. The development component 200 may transfer usage of the asset via transfer path 40, directly to the user component 300 or indirectly via another component comprised by the business entity. The transfer of usage of the asset from the development component 200 to the user component 300 may comprise a physical transfer of the asset to the user component 300, or may alternatively comprise making the asset available to the user component 300 at a location of the development component 200 or at a location elsewhere within the business entity 600. In one embodiment, the development component 200 may function as a service provider by installing the asset for usage by the user component 300.

If the user component 300 incurs a usage burden from usage of the asset, then the user 300 will receive compensation from at least one of the development component 200 (via transfer path 61) and the beneficiary component 200 (via transfer path 62). Although the beneficiary component 100 did not directly cause the usage burden, a contribution to the compensation by the beneficiary component 100 may induce the beneficiary component 100 to reduce funds to the development component 200 in the future for other projects, which is a reason why the compensation scheme may beneficially require the beneficiary component 100 to contribute to the compensation.

The usage burden may be determined as an expense of using the asset in excess of an expense of using a predetermined reference asset, and the compensation has a magnitude that is a function of the usage burden. The magnitude of the compensation, and the distribution of the relative amounts contributed to the compensation by the beneficiary component 100 and the development component 200, may be in accordance with a specified or predetermined formula, algorithm, agreement, directive by an executive of the business entity 600, etc.

Figure 4:
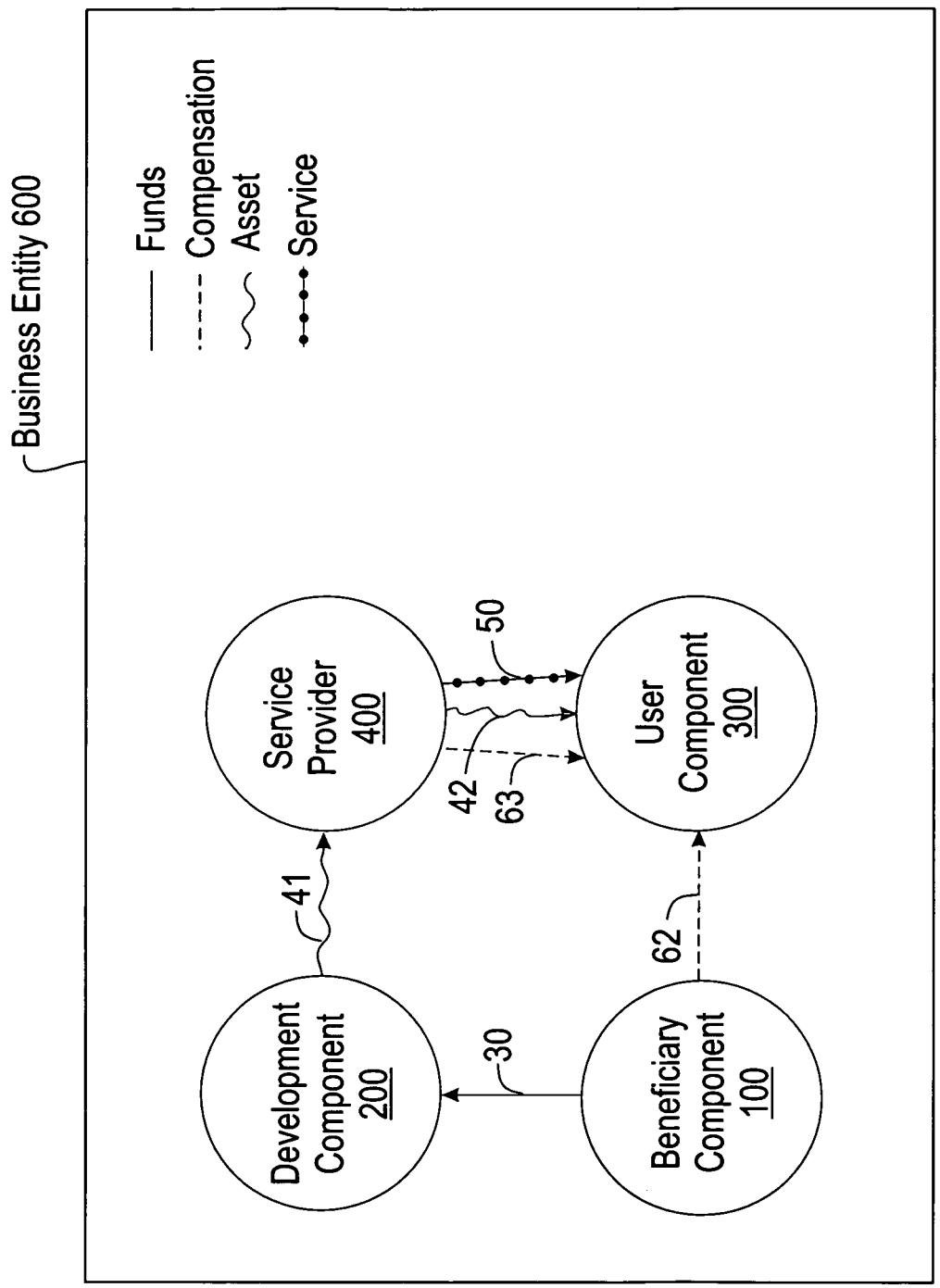

FIG. 4 depicts the business entity 600 of FIG. 3 with an addition of a service provider 400 comprised by the business entity 600 (e.g., as a component of the business entity 600). The development component 200 makes the asset available to the service provider 400 via transfer path 41, and the service provider 400 makes the asset available to the user component 300 via transfer path 42. The service provider 400 may additionally provide a service to the user component 300 via transfer path 50. For example, if the asset is a software application, the service may be installation or deployment of the application for the user component, providing consultation for the user component in relation to installing, deploying, or using the asset, etc. (e.g., via an on-line help desk). Thus the user component 300 receives a resource that comprises the asset or both the asset and the service, and may consist essentially of the asset or both the asset and the service.

If the user component 300 incurs a usage burden from usage of the resource, then the user 300 will receive compensation from at least one of the beneficiary component 100 (via transfer path 62) and the service provider 400 (via transfer path 63). The contribution of the service provider 400 to the compensation, if any, may depend on an extent to which the service provider 400 contributed to the usage burden by providing access to the asset by the user component 300 via transfer path 42 and/or by providing the service to the user component 300 via transfer path 50.

Figure 5:
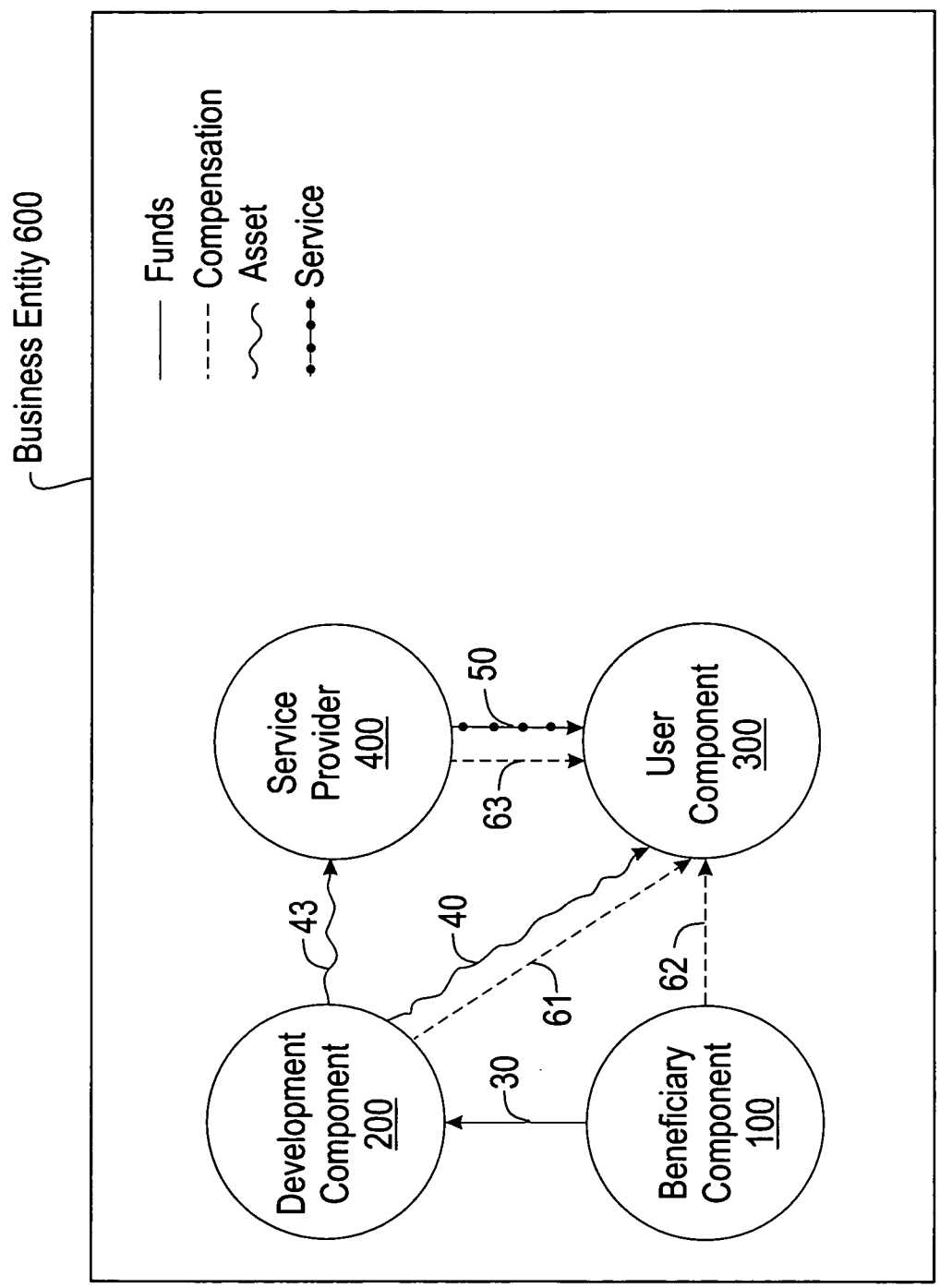

FIG. 5 depicts the business entity 600 of FIG. 3 with an addition of a service provider 400 comprised by the business entity 600 (e.g., as a component of the business entity 600) in an alternative embodiment involving the service provider 400. The business entity 600 comprises the same components in FIGS. 4 and 5. FIG. 5 differs from FIG. 4 by virtue of the asset in FIG. 5 being made available to the user component 300 by the development component 200 via transfer path 40 (as in FIG. 3) without first being made available to the service provider 400 as in FIG. 4. Thus, the service provider 400 does not make the asset available to the user component 300 in FIG. 5. In FIG. 5, however, the development component 200 makes another asset available to the service provider 400 via transfer path 43, and this another asset is not the same asset as the asset described supra as being developed by the development component 200 for usage by the user component 300. This another asset serves to support the providing of the service by the service provider 400 to the user component 300 via transfer path 50. For the embodiment of FIG. 5, the resource made accessible to the user component 300 comprises the asset made accessible via transfer path 40 or both the asset made accessible via transfer path 40 and the service, and may consist essentially of the asset made accessible via transfer path 40 or both the asset made accessible via transfer path 40 and the service.

If the user component 300 incurs a usage burden from usage of the resource, then the user 300 will receive compensation from at least one of the development component 200 (via transfer path 61), the beneficiary component 100 (via transfer path 62), and the service provider 400 (via transfer path 63).

Figure 6:
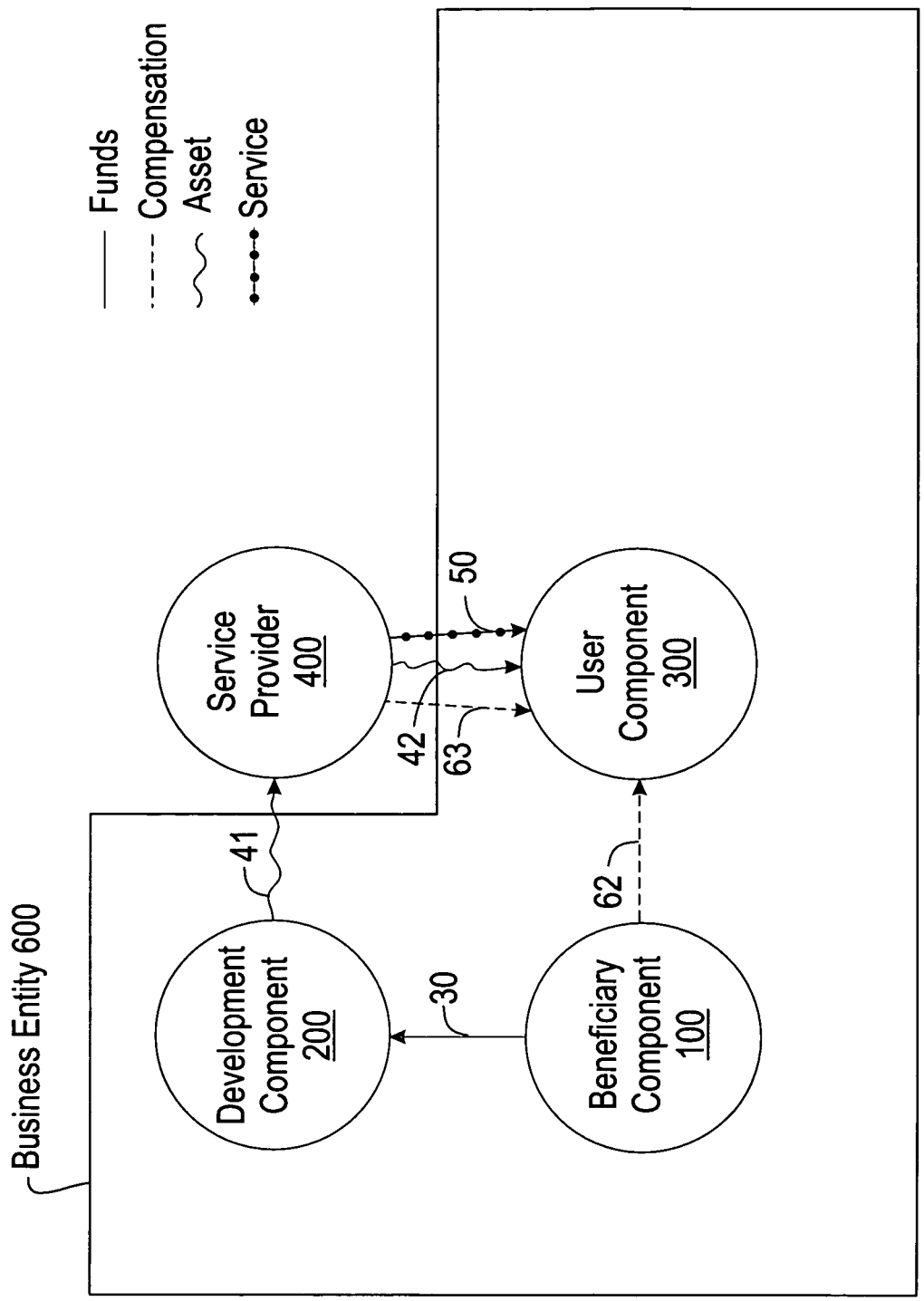

FIG. 6 is the same as FIG. 4, except that the service provider 400 in FIG. 6 is not comprised by the business entity 600. Thus, all obligations required of the service provider 400 (i.e., making the asset available via transfer path 42, providing the service via transfer path 50, and contributing to the compensation via transfer path 63) may be established by a contract between the service provider 400 and the business entity 600.

Figure 7:
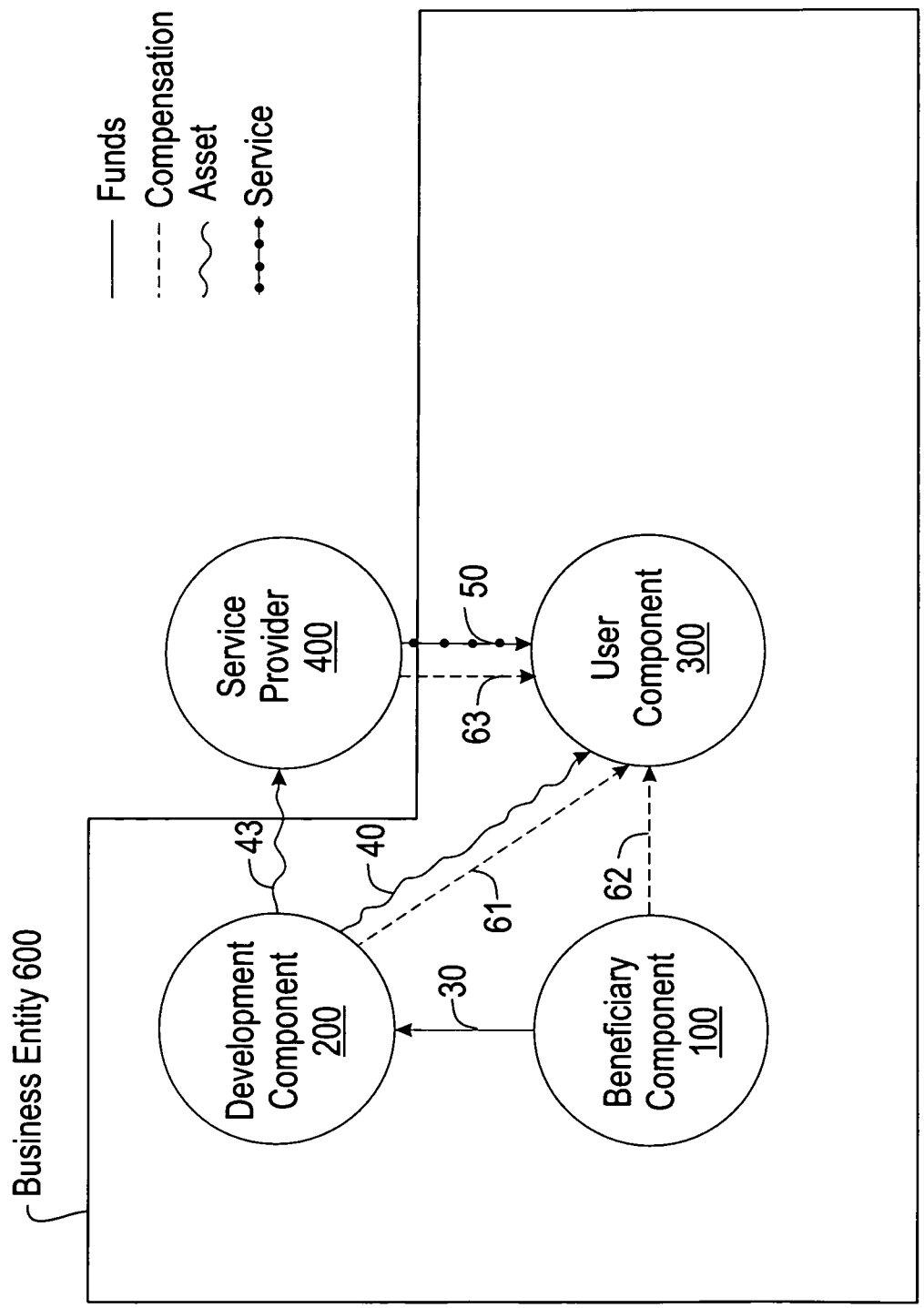

FIG. 7 is the same as FIG. 5, except that the service provider 400 in FIG. 7 is not comprised by the business entity 600. Thus, all obligations required of the service provider 400 (i.e., providing the service via transfer path 50 and contributing to the compensation via transfer path 63) may be established by a contract between the service provider 400 and the business entity 600.

Figure 8:
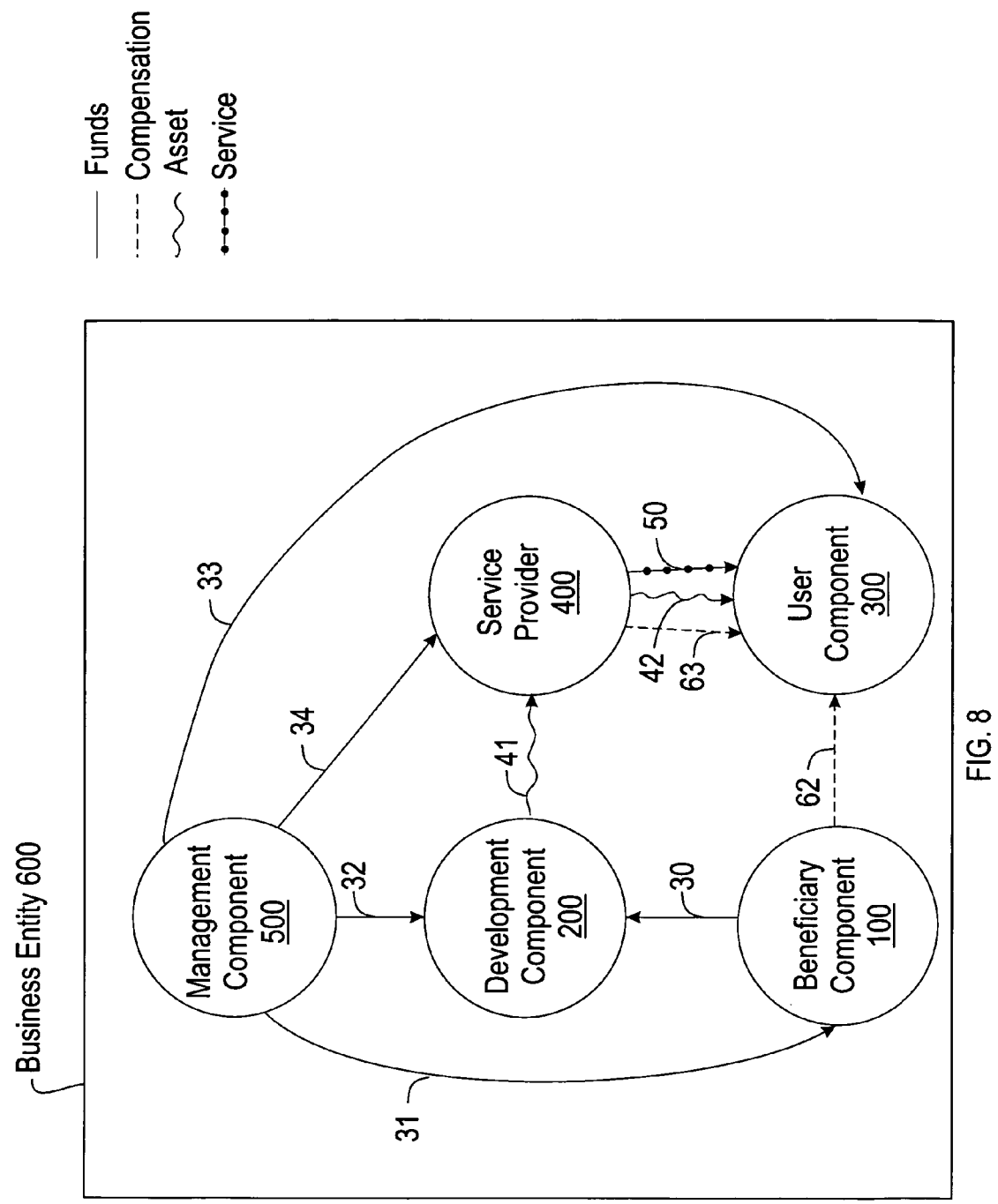

FIG. 8 depicts the business entity 600 of FIG. 4 with an addition of a management component 500 comprised by the business entity 600. The management component 500 may have responsibility for overall finding relevant to the development of the asset and accordingly may distribute financial value among: the beneficiary component 100 via transfer path 31, the development component 200 via transfer path 32, the user component 300 via transfer path 33, and the service provider 400 via the transfer path 34. Said distributing of financial value by the management component 500 may finance the total cost pertaining to the resource, wherein the total cost may comprises a development cost, a maintenance cost, and a usage cost, wherein the usage cost may comprise the usage burden, and wherein responsive to an analysis of the usage burden by the management component, said distributing by the management component 500 may comprise increasing or decreasing the development cost to reduce the total cost. Although FIG. 8 depicts the service provider 400, the service provider 400 may not be present, which is analogous to FIG. 3.

Figure 9:
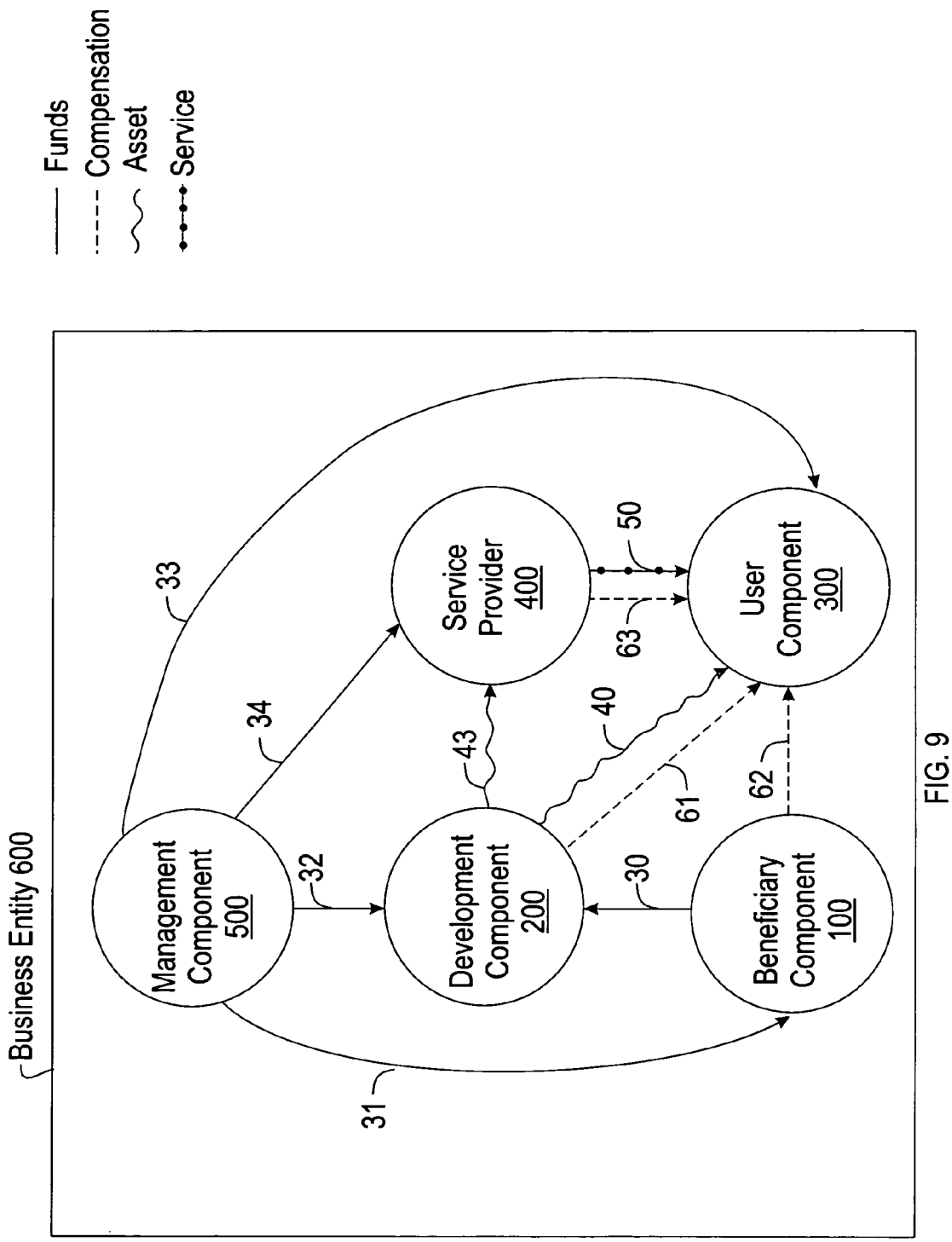

FIG. 9 depicts the business entity 600 of FIG. 5 with an addition of a management component 500 comprised by the business entity 600. The management component 500 may have responsibility for overall funding relevant to the development of the asset and accordingly may distribute financial value among: the beneficiary component 100 via transfer path 31, the development component 200 via transfer path 32, the user component 300 via transfer path 33, and the service provider 400 via the transfer path 34. Said distributing of financial value by the management component 500 may finance the total cost pertaining to the resource, wherein the total cost may comprises a development cost, a maintenance cost, and a usage cost, wherein the usage cost may comprise the usage burden, and wherein responsive to an analysis of the usage burden by the management component, said distributing by the management component 500 may comprise increasing or decreasing the development cost to reduce the total cost.

Figure 10:
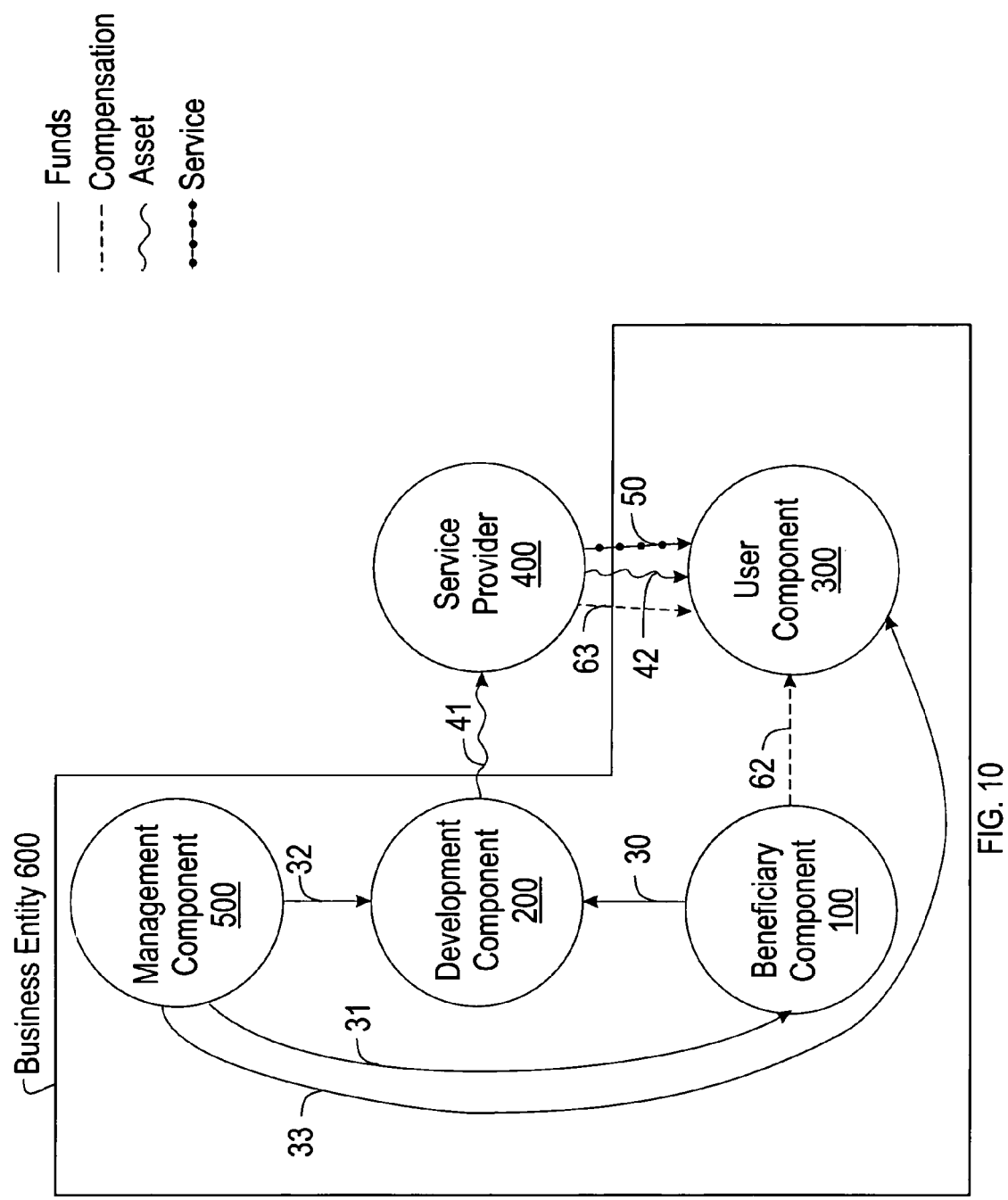

FIG. 10 depicts the business entity 600 of FIG. 6 with an addition of a management component 500 comprised by the business entity 600. The management component 500 may have responsibility for overall finding relevant to the development of the asset and accordingly may distribute financial value among: the beneficiary component 100 via transfer path 31, the development component 200 via transfer path 32, and the user component 300 via transfer path 33. The management component 500 does not distribute financial value to the service provider 400, since the service provider 400 is not comprised by the business entity 600. Said distributing of financial value by the management component 500 may finance the total cost pertaining to the resource, wherein the total cost may comprises a development cost, a maintenance cost, and a usage cost, wherein the usage cost may comprise the usage burden, and wherein responsive to an analysis of the usage burden by the management component, said distributing by the management component 500 may comprise increasing or decreasing the development cost to reduce the total cost.

Figure 11:
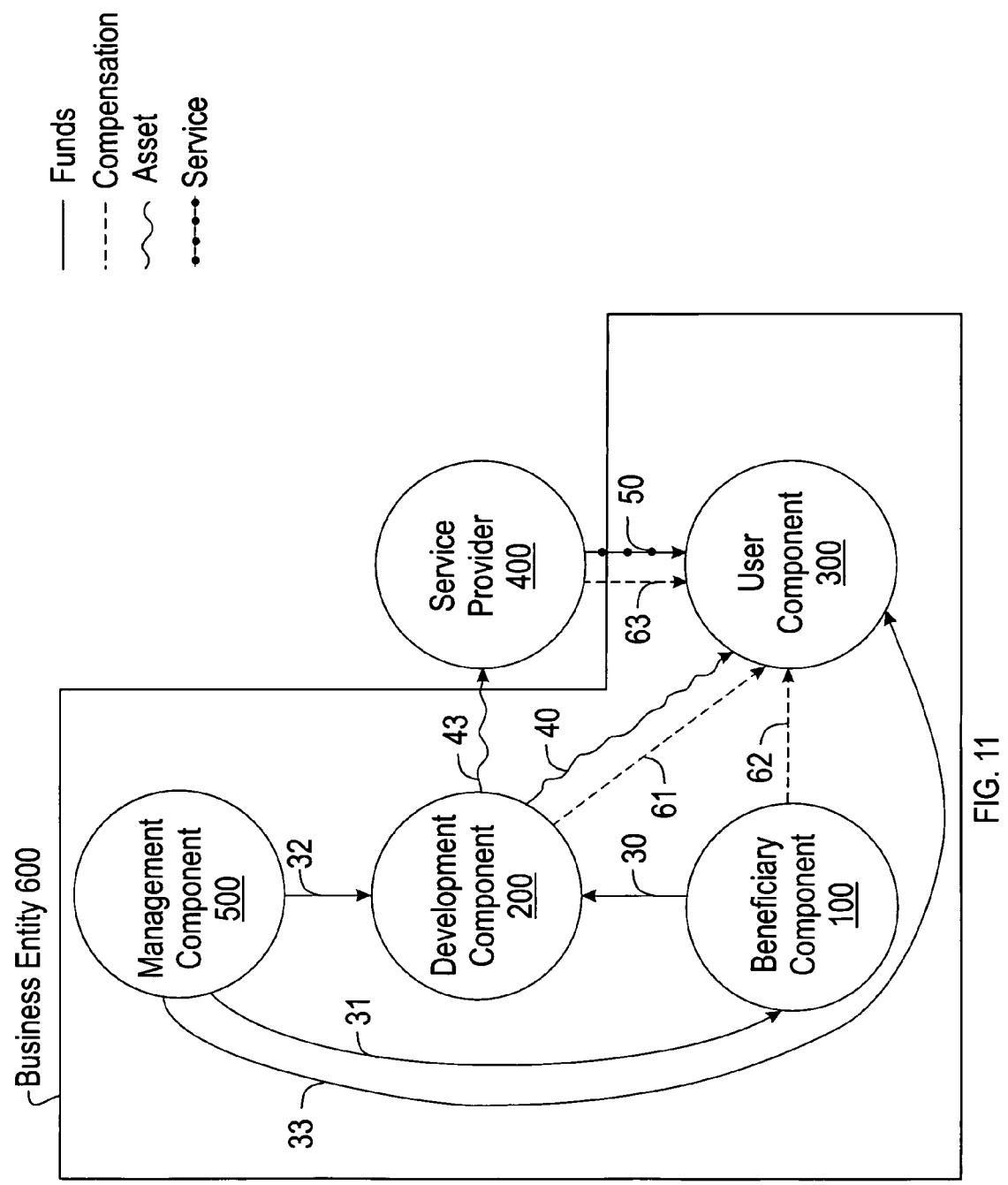

FIG. 11 depicts the business entity 600 of FIG. 7 with an addition of a management component 500 comprised by the business entity 600. The management component 500 may have responsibility for overall finding relevant to the development of the asset and accordingly may distribute financial value among: the beneficiary component 100 via transfer path 31, the development component 200 via transfer path 32, and the user component 300 via transfer path 33. The management component 500 does not distribute financial value to the service provider 400, since the service provider 400 is not comprised by the business entity 600. Said distributing of financial value by the management component 500 may finance the total cost pertaining to the resource, wherein the total cost may comprises a development cost, a maintenance cost, and a usage cost, wherein the usage cost may comprise the usage burden, and wherein responsive to an analysis of the usage burden by the management component, said distributing by the management component 500 may comprise increasing or decreasing the development cost to reduce the total cost.

FIGS. 12-16 are block diagrams depicting, between two business entities, flow of a resource, funds, and compensation, said compensation being in response to a usage burden incurred from using the resource, in accordance with embodiments of the present invention.

Figure 12:
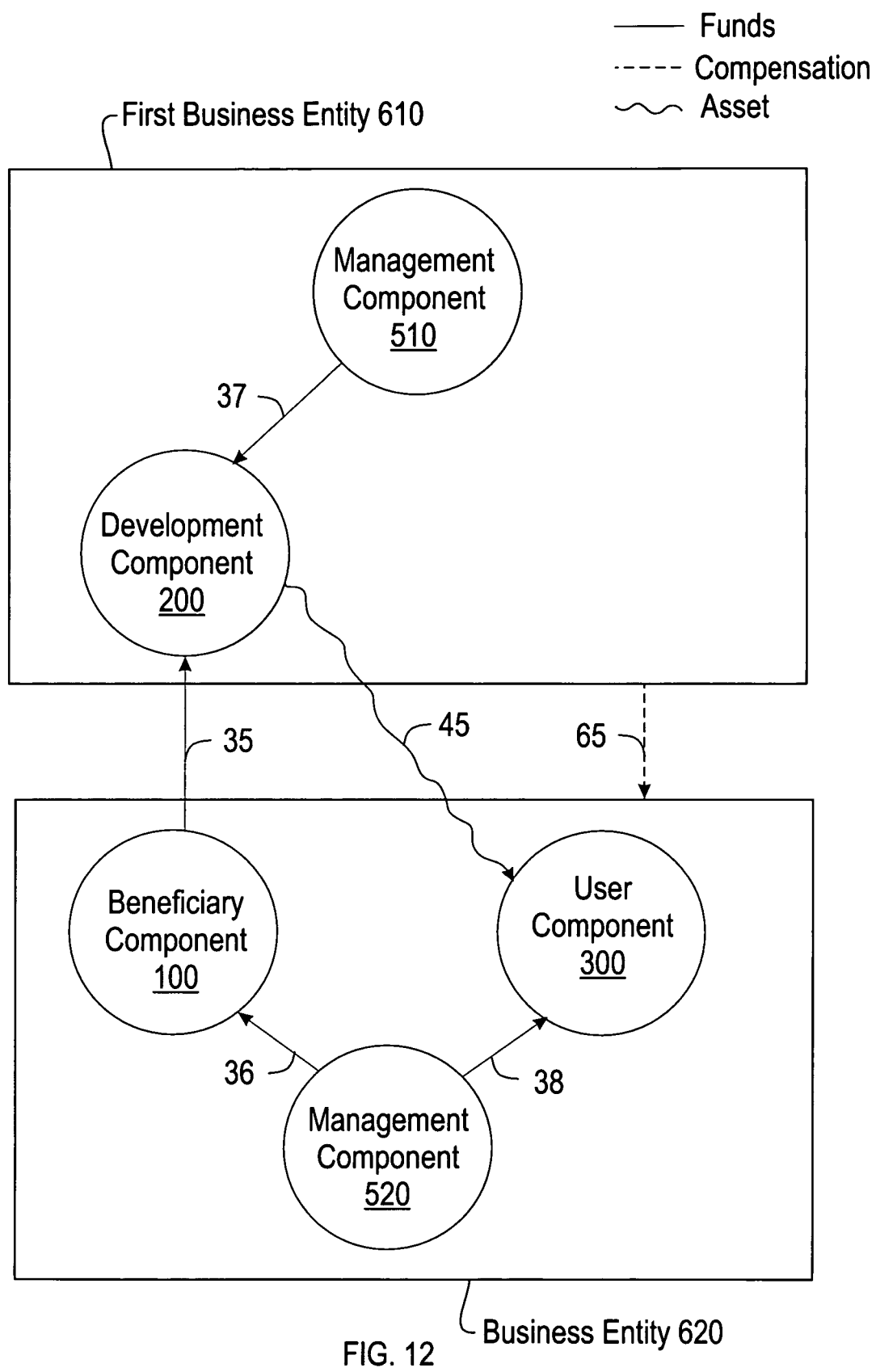
FIGS. 12-16 are block diagrams depicting, between two business entities, flow of a resource, funds, and compensation, said compensation being in response to a usage burden incurred from using the resource, in accordance with embodiments of the present invention.

FIG. 12 depicts a business entity 610 and a business entity 620, wherein the business entity 610 develops an asset for usage by the business entity 620. The business entity 610 and the business entity 620 may be different business entities.

The business entity 610 comprises a development component 200 and a management component 510. The management component 510 may have responsibility for overall finding relevant to the development of the asset by the business entity 610 and accordingly may distribute financial value to the development component 200 via transfer path 37 to support operation of the development component 200.

The business entity 620 comprises a beneficiary component 100, a user component 300, and a management component 520. The management component 520 may have responsibility for overall finding relevant to usage of the asset and accordingly may distribute financial value to the beneficiary component 100 via transfer path 36 and the user component 300 via transfer path 38. Said distributing of financial value by the management component 510 may finance the cost pertaining to usage of the asset.

The development component 200 of the business entity 610 develops the asset for usage by the user component 300 of the business entity 620. The beneficiary component 100 may transfer financial value via transfer path 35 to the development component 200 to develop an asset for usage by the user component 300. Alternatively, the development component 200 may develop the asset in an absence of the transfer of financial value from the beneficiary component 100 to the development component 200.

After the development component 200 develops the asset, the user component 300 is provided access to the asset. The development component 200 may provide access to the asset via transfer path 45, directly to the user component 300 or indirectly via another component comprised by the business entity 610 and/or the business entity 620. The providing of access of the asset from the development component 200 to the user component 300 may comprise a physical transfer of the asset to the user component 300, or may alternatively comprise making the asset available to the user component 300 at a location of the development component 200 or at a location elsewhere within the business entity 610. In one embodiment, the development component 200 may function as a service provider by installing the asset for usage by the user component 300.

If the user component 300 incurs a usage burden from usage of the asset, then the business entity 620 will receive compensation from the business entity 610 via transfer path 65. The usage burden may be determined as an expense of using the asset in excess of an expense of using a predetermined reference asset, and the compensation has a magnitude that is a function of the usage burden. The magnitude of the compensation may be in accordance with a specified or predetermined formula, algorithm, agreement, etc.

Figure 13:
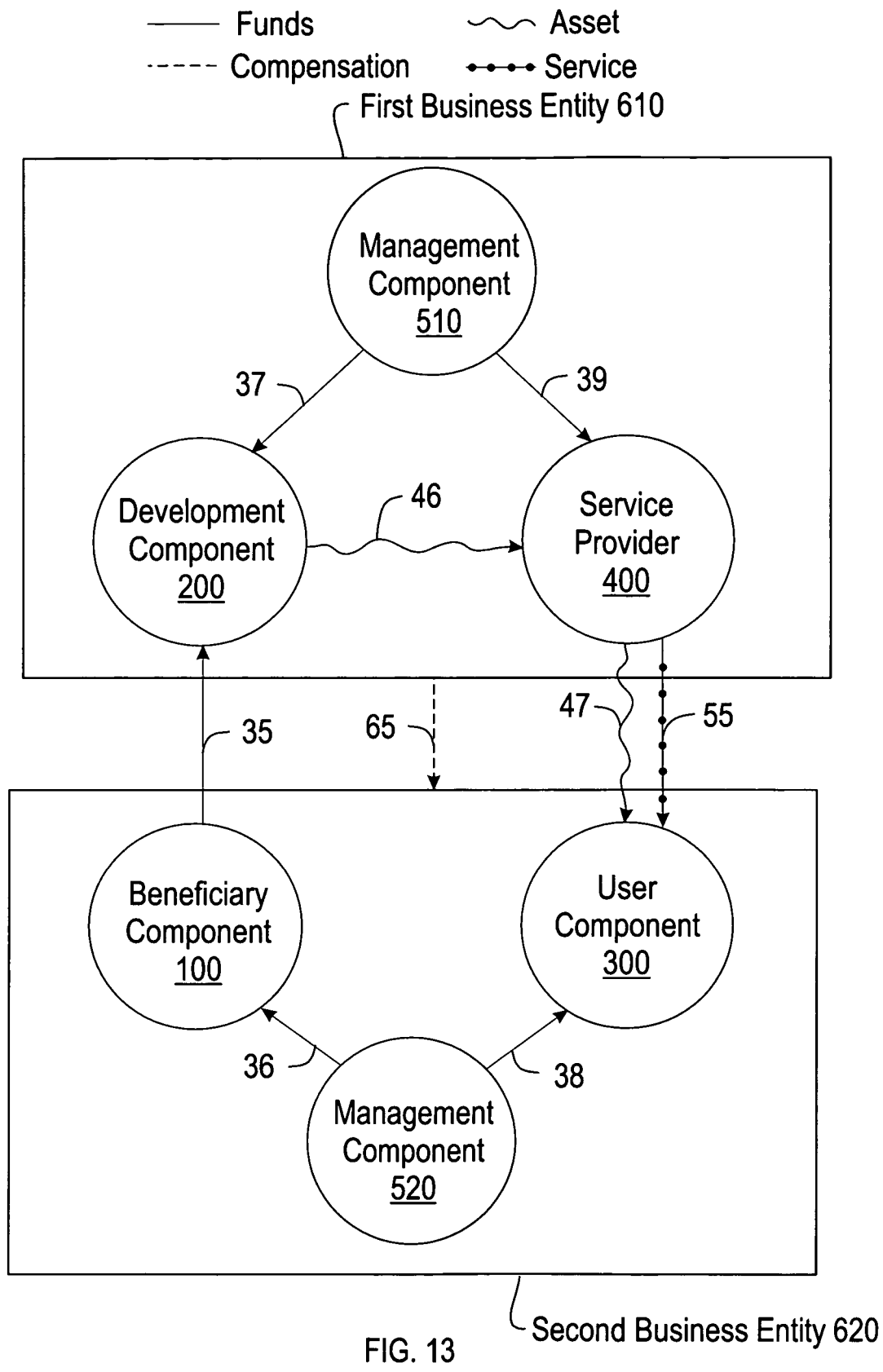

FIG. 13 depicts the business entities 610 and 620 of FIG. 12 with an addition of a service provider 400 comprised by the business entity 610 (e.g., as a component of the business entity 610). The development component 200 makes the asset available to the service provider 400 via transfer path 46, and the service provider 400 makes the asset available to the user component 300 via transfer path 47. The service provider 400 may additionally provide a service to the user component 300 via transfer path 55. For example, if the asset is a software application, the service may be installation or deployment of the application for the user component, providing consultation for the user component in relation to installing, deploying, or using the asset, etc. (e.g., via an on-line help desk). Thus the user component 300 receives a resource that comprises the asset or both the asset and the service, and may consist essentially of the asset or both the asset and the service.

If the user component 300 incurs a usage burden from usage of the resource, then the business entity 620 will receive compensation from the business entity 610 via transfer path 65. The usage burden may be determined as an expense of using the asset in excess of an expense of using a predetermined reference asset, and the compensation has a magnitude that is a function of the usage burden. The magnitude of the compensation may be in accordance with a specified or predetermined formula, algorithm, agreement, etc.

Figure 15:
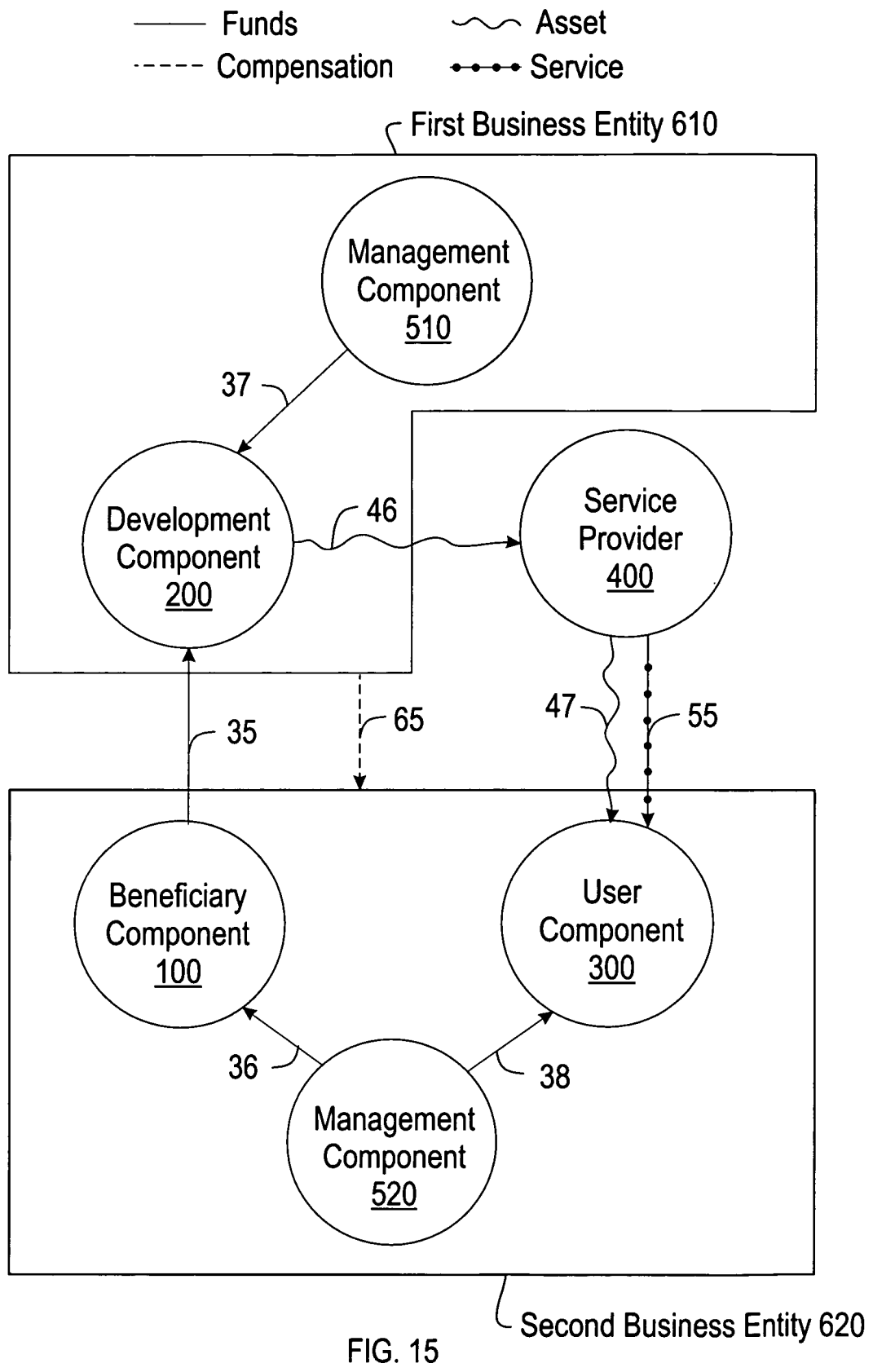

Although FIG. 13 depicts the service provider 400 as being comprised by business entity 610, the service provider 400 may alternatively be comprised by business entity 620 (not shown), or in one embodiment may not be comprised by either of business entities 610 and 620 as discussed infra in conjunction with FIG. 15.

Figure 14:
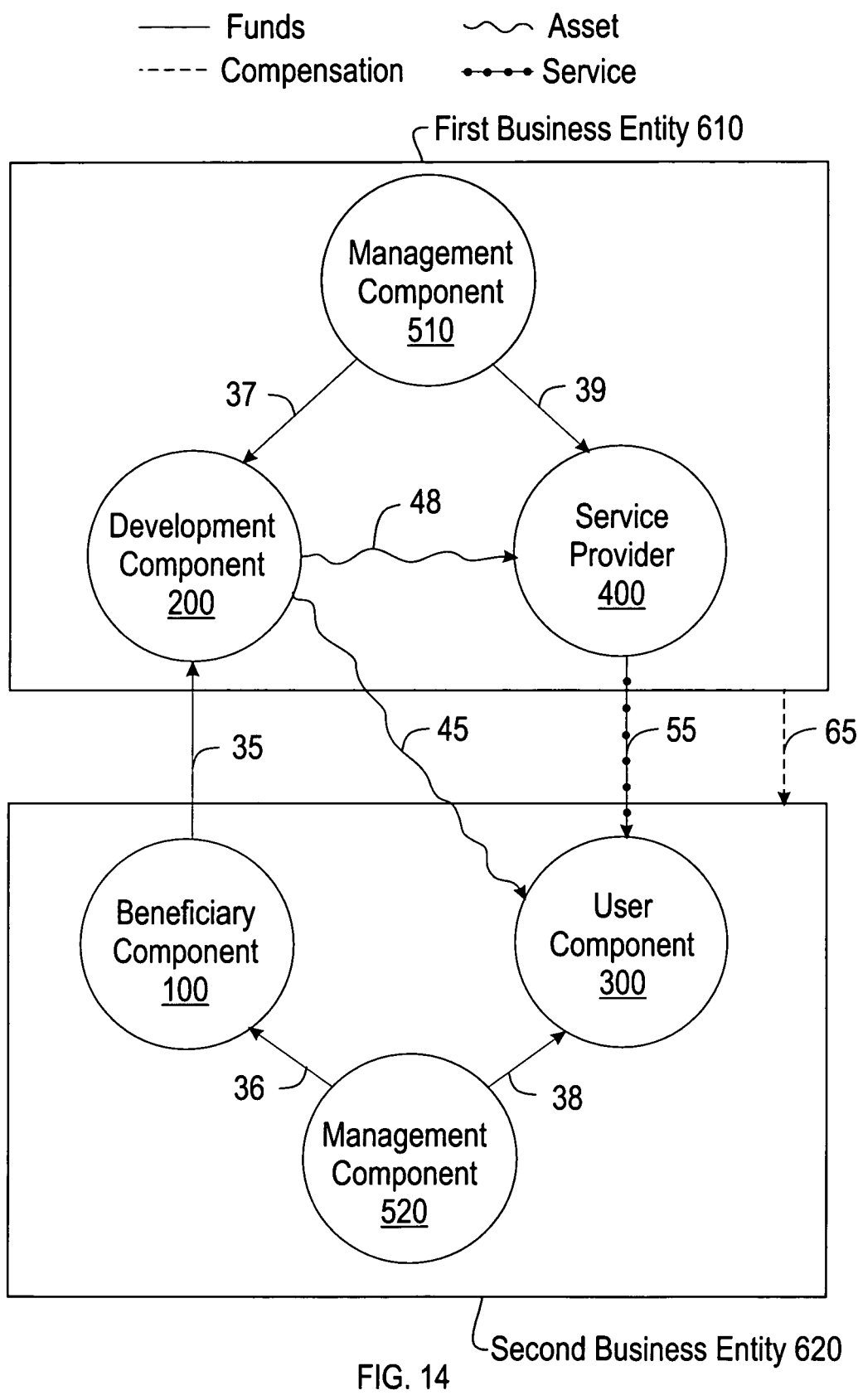

FIG. 14 depicts the business entities 610 and 620 of FIG. 12 with an addition of a service provider 400 comprised by the business entity 610 (e.g., as a component of the business entity 610) in an alternative embodiment involving the service provider 400. The business entities 610 and 620 comprise the same components in FIGS. 13 and 14. FIG. 14 differs from FIG. 13 by virtue of the asset in FIG. 14 being made available to the user component 300 by the development component 200 via transfer path 45 (as in FIG. 12) without first being made available to the service provider 400 as in FIG. 13. Thus, the service provider 400 does not make the asset available to the user component 300 in FIG. 14. In FIG. 14, however, the development component 200 makes another asset available to the service provider 400 via transfer path 48, and this another asset is not the same asset as the asset described supra as being developed by the development component 200 for usage by the user component 300. This another asset serves to support the providing of the service by the service provider 400 to the user component 300 via transfer path 55. For the embodiment of FIG. 14, the resource made accessible to the user component 300 comprises the asset made accessible via transfer path 45 or both the asset made accessible via transfer path 45 and the service, and may consist essentially of the asset made accessible via transfer path 45 or both the asset made accessible via transfer path 45 and the service.

If the user component 300 incurs a usage burden from usage of the resource, then the business entity 620 will receive compensation from the business entity 610 via transfer path 65. The usage burden may be determined as an expense of using the asset in excess of an expense of using a predetermined reference asset, and the compensation has a magnitude that is a function of the usage burden. The magnitude of the compensation may be in accordance with a specified or predetermined formula, algorithm, agreement, etc.

Figure 16:
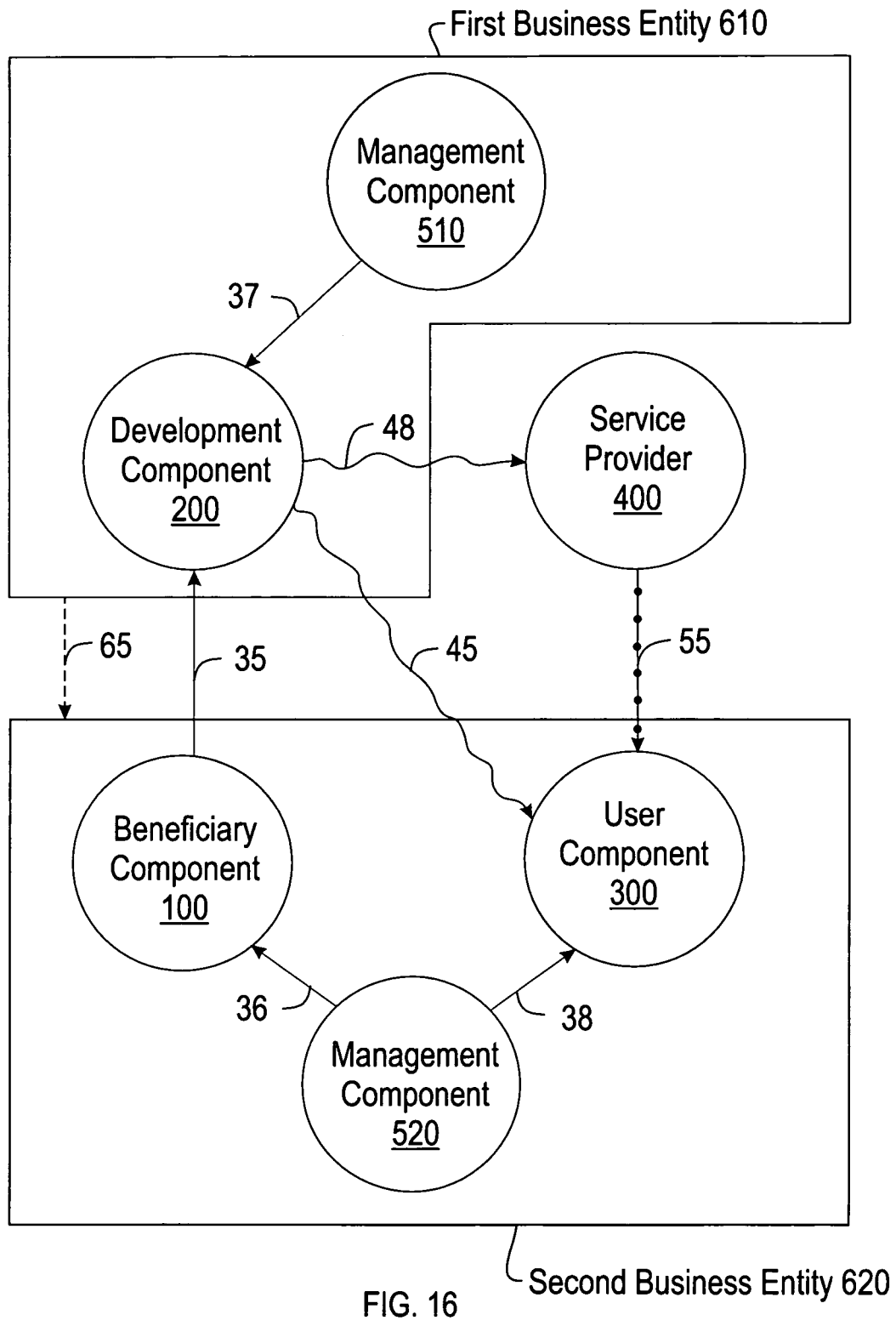

Although FIG. 14 depicts the service provider 400 as being comprised by business entity 610, the service provider 400 may alternatively be comprised by business entity 620 (not shown), or in one embodiment may not be comprised by either of business entities 610 and 620 as discussed infra in conjunction with FIG. 16.

FIG. 15 is the same as FIG. 13, except that the service provider 400 in FIG. 15 is not comprised by the business entity 610. Thus, all obligations required of the service provider 400 (i.e., making the asset available via transfer path 47 and providing the service via transfer path 55) may be established by a contract between the service provider 400 and the business entity 610.

FIG. 16 is the same as FIG. 14, except that the service provider 400 in FIG. 16 is not comprised by the business entity 610. Thus, all obligations required of the service provider 400 (i.e., providing the service via transfer path 55) may be established by a contract between the service provider 400 and the business entity 610.

Figure 17:
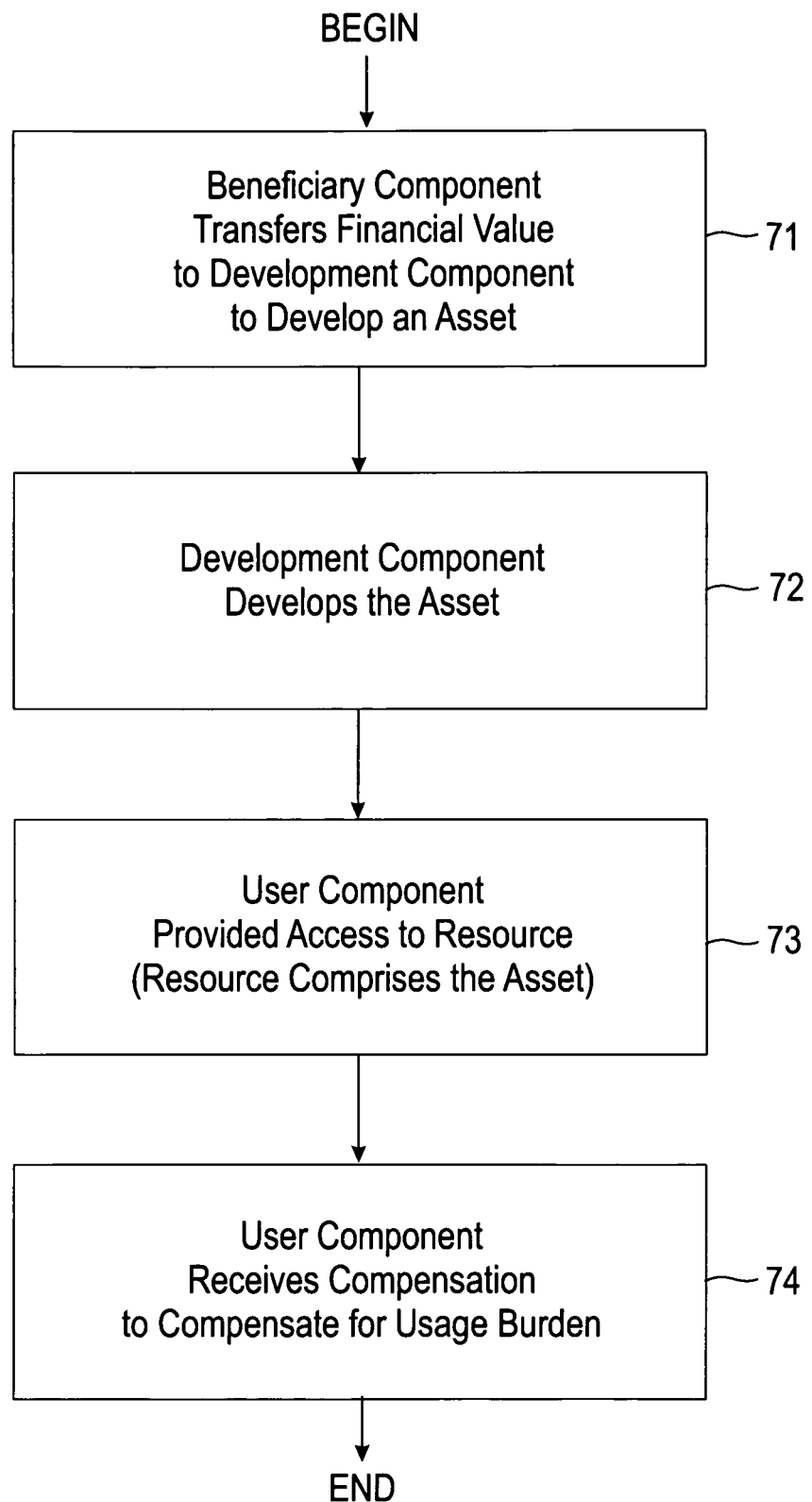
FIG. 17 is a flow chart describing implementation of the flow of the resource, funds, and compensation for the business entity depicted in FIGS. 3-11, in accordance with embodiments of the present invention.

FIG. 17 is a flow chart with steps 71-74 describing implementation of the flow of the resource, funds, and compensation for the business entity 600 depicted in FIGS. 3-11, in accordance with embodiments of the present invention. The business entity 600 comprises the beneficiary component 100, the development component 200, and the user component 300. The business entity 600 may further comprise the service provider 400 and/or the management component 500.

In step 71, the beneficiary component 100 transfers financial value to the development component 200 to develop an asset. In step 72, the development component 200 develops the asset. In step 73, the user component 300 is provided access to the resource, wherein the resource comprises the asset and may further comprise a service. In step 74, if the user component 300 incurs a usage burden from using the resource, then the second business entity 620 will receive compensation from the first business entity 610 as described supra.

Figure 18:
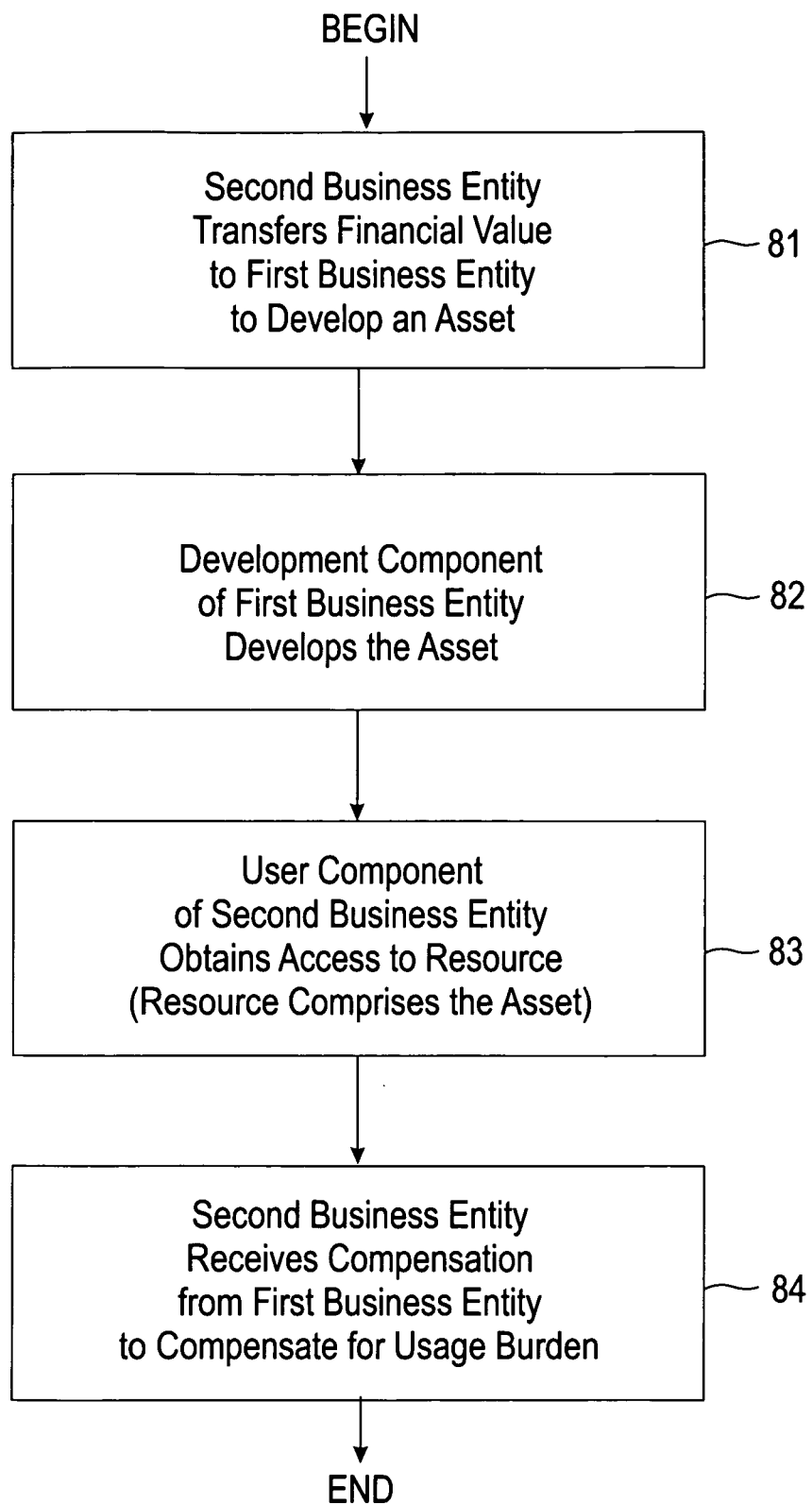
FIG. 18 is a flow chart describing implementation of the flow of the resource, funds, and compensation for the business entities depicted in FIGS. 12-16, in accordance with embodiments of the present invention.

FIG. 18 is a flow chart with steps 81-84 describing implementation of the flow of the resource, funds, and compensation for the business entity 610 and 620 depicted in FIGS. 12-16, in accordance with embodiments of the present invention. The business entity 610 comprises the development component 200 and the management component 510, and may further comprise the service provider 400. The business entity 620 comprises a beneficiary component 100, a user component 300, and a management component 520, and may further comprise the service provider 400 in an alternative embodiment.

In step 81, the first business entity 610 transfers financial value to the second business entity 620 to develop an asset (from beneficiary component 100 to development component 200). In step 82, the development component 200 develops the asset. In step 83, the user component 300 is provided access to the resource, wherein the resource comprises the asset and may further comprise a service. In step 84, if the user component 300 incurs a usage burden from using the resource, then the second business entity 620 will receive compensation from the second business entity 610 as described supra.

As described supra in relation to the embodiments of FIGS. 3-17, the usage burden may be determined as an expense of using the asset in excess of an expense of using a predetermined reference asset. For example, the expense of using the resource may be an expense function of an amount of time spent in using the resource to accomplish a goal in excess of an amount of time that was spent or would be spent in using the reference resource to accomplish the goal. If the asset comprised by the resource is a software application adapted to be executed on a computer system, then a computation of the expense function may utilize data derived from: a time monitoring tool within the application, a time monitoring tool within an operating system that executes the application on the computer system, an analysis of logs generated by the application, an analysis of logs generated by the operating system, and combinations thereof.

The compensation may have a magnitude that is a function of the usage burden. The magnitude of the compensation may be a function of the usage burden, such as a linear or nonlinear function of the usage burden. The magnitude of the compensation about equal to the usage burden, or may alternatively exceed the usage burden so as to include an extra penalty component, or may alternatively be less than the usage burden. Although a function of the usage burden, the magnitude of the compensation may have a constant component that is independent of the usage burden. Alternatively, the magnitude of the compensation may be independent of the usage burden such that the very existence of the usage burden triggers a specified magnitude of compensation. For the embodiments of FIGS. 3-11, a formula or algorithm for computing the magnitude of the usage burden may be arrived at by agreement among some or all of the affected components of the business entity 600 and/or the service provider 400, by policy of the business entity 600, by management directive, or by any other mechanism. For the embodiments of FIGS. 12-17, a formula or algorithm for computing the magnitude of the usage burden may be arrived at by agreement between the business entities 610 and 620.

In one embodiment, the magnitude of compensation may change with usage time (e.g., time of the day, peak hours, number of simultaneous users at the actual time of usage, etc.) of the resource. In one embodiment, the magnitude of compensation may depend on technical requirements (e.g., installing a fast communication network) and/or on the existence (or lack of existence) of implementation of a user training process, a business transformation process, etc. that supports or is otherwise related to the resource.

In one embodiment in which the resource comprises a software application having a sequence of releases during its life cycle, the magnitude of compensation may vary with the release. For example, if release 2 occurs after release 1, then the magnitude of compensation may be higher for release 2 than for release 1 for a given usage burden, reflecting the expectation of the user(s) and/or user component for improved efficiency when moving from release 1 to release 2. In addition, a higher usage burden may be computed for release 2 than for release 1 for a given amount of extra time spent by the user(s) and/or user component, again reflecting the expectation of the user(s) and/or user component for improved efficiency when moving from release 1 to release 2.

For the embodiments of FIGS. 12-17, the compensation is paid by the business entity 610 to the business entity 620. For the embodiments of FIGS. 3-11, however, the contributions to payment of the compensation may be distributed among a plurality of compensators as follows. Once the magnitude of the usage burden is determined, a formula or algorithm for the distribution of the compensation from the various compensators (i.e., contributors to the compensation) may be arrived at by agreement among some or all of the affected parties, by management directive, or by any other mechanism. In one embodiment, the compensation paid by each compensator is a function of an extent to which each compensator contributed to the usage burden (e.g., as measured by the extra time spent in using the resource, as caused by each compensator). In one embodiment, the compensation paid by at least one compensator is not a function of an extent to which said at least compensator contributed to the usage burden (e.g., the beneficiary component 100 may be a compensator even though the beneficiary component 100 does not contribute to the usage burden). The amount of the compensation charged to a compensator who did not contribute to the usage burden may be established as fixed amount of compensation, a percent of the total compensation, etc, by contract, policy of the relevant business entity, directive of an executive officer or manager of the relevant business entity, etc. In one embodiment, the compensators contribute equally to payment of the compensation. In one embodiment, the compensators contribute by fixed predetermined percentages to payment of the compensation (e.g., it may be predetermined that there are two compensators C1, C2, and C3, wherein C1, C2, and C3 contribute 50%, 30%, and 20%, respectively, to payment of the compensation).

As an alternative, the magnitude of the total compensation may be determined after the amount of compensation contributed by each compensator is determined, by summing the contribution to the compensation of each compensator.

In one embodiment, a user of a software application may receive compensation in response to the user having incurred a usage burden from using the software application. The compensation may be received from a party that contributed to the usage burden and may be determined by a metric previously agreed upon by the user and the party. The party may be, inter alia, a developer that developed the software application or a service provider that provided a service supporting usage of the software application by the user.

In one embodiment, compensation may be provided to a user of a software application in response to the user having incurred a usage burden from using the software application. The compensation may be provided by a party that contributed to the usage burden and may be determined by a metric previously agreed upon by the user and the party. The party may be, inter alia, a developer that developed the software application or a service provider that provided a service supporting usage of the software application by the user.

Figure 19:
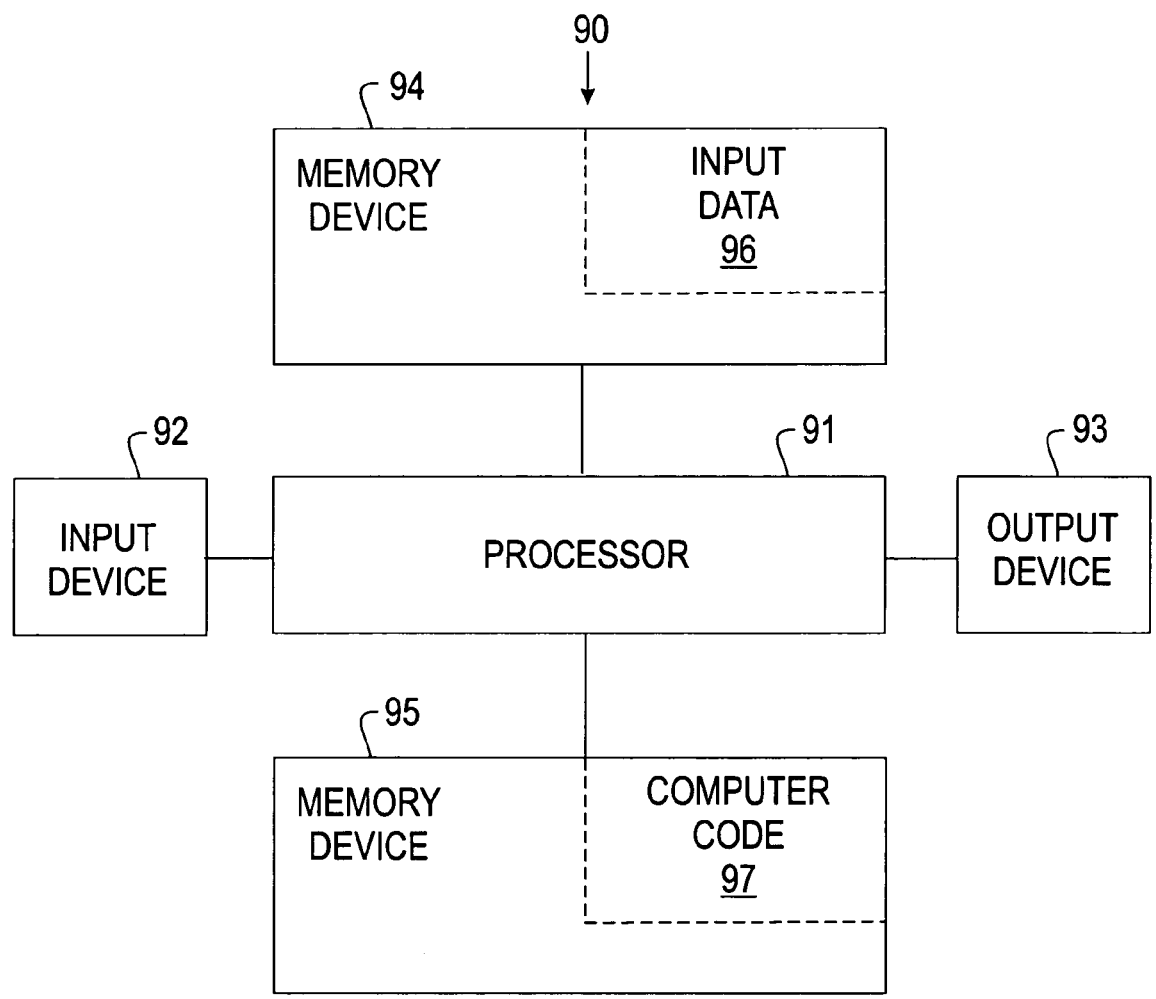
FIG. 19 illustrates a computer system for implementing aspects of the present invention.

FIG. 19 illustrates a computer system 90 for implementing aspects of the present invention such as, inter alia, for computing the magnitude of the compensation or the amount of compensation contributed by each compensator. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for implementing aspects of the present invention such as, inter alia, for computing the magnitude of the compensation or the amount of compensation contributed by each compensator. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 19) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for implementing aspects of the present invention such as, inter alia, for computing the magnitude of the compensation or the amount of compensation contributed by each compensator.

While FIG. 19 shows the computer system 90 as a particular configuration of hardware and software, any configuration of hardware and software, as would be known to a person of ordinary skill in the art, may be utilized for the purposes stated supra in conjunction with the particular computer system 90 of FIG. 19. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for managing a usage cost of a resource, said method comprising:
   accessing, via a processor of a computer system, the resource by a user component of a business entity after an asset has been developed by a development component of the business entity, wherein the resource consists essentially of the asset or both the asset and a service, wherein the service supports usage of the asset and is provided by a service provider, and wherein if the resource consists essentially of the asset and the service then said accessing comprises accessing the service from the service provider; and
   receiving compensation by the user component from at least one compensator in response to the user component having incurred a usage burden from using the resource, wherein the usage burden is an expense of using the resource in excess of an expense of using a predetermined reference resource, wherein the compensation has a magnitude that is a function of the usage burden, and wherein the at least one compensator comprises at least one of: (A) a component of the business entity and (B) the service provider if the resource consists essentially of the asset and the service.

2. The method of claim 1, wherein the resource consists essentially of the asset and the service, and wherein the at least one compensator comprises the service provider.

3. The method of claim 2, wherein the service provider is comprised by the business entity.

4. The method of claim 2, wherein the service provider is not comprised by the business entity.

5. The method of claim 2, wherein said accessing comprises accessing the asset from the service provider, and wherein the at least one compensator does not comprise the development component.

6. The method of claim 2, wherein said accessing comprises accessing the asset from within the business entity, and wherein the at least one compensator comprises the development component.

7. The method of claim 1,
   wherein the method further comprises distributing funds, by a management component of the business entity, to the user component and the development component;
   wherein the at least one compensator comprises the development component;
   wherein said distributing is for financing a total cost pertaining to the resource;
   wherein the total cost comprises a development cost, a maintenance cost, and a usage cost;
   wherein the usage cost comprises the usage burden; and wherein responsive to an analysis of the usage burden by the management component, said distributing comprises increasing or decreasing the development cost to reduce the total cost.

8. The method of claim 7,
wherein said distributing further comprises distributing funds, by the management component, to a beneficiary entity of the business entity;
wherein the beneficiary entity of the business entity has transferred financial value to the development component to develop the asset; and
wherein the at least one compensator comprises the beneficiary component.

9. The method of claim 7,
wherein the resource consists essentially of the asset and the service;
wherein the business entity comprises the service provider;
wherein said distributing further comprises distributing funds, by the management component, to the service provider; and
wherein the at least one compensator comprises the service provider.

10. The method of claim 1, wherein the expense of using the resource is an expense function of an amount of time spent in using the resource to accomplish a goal in excess of an amount of time that was spent or would be spent in using the reference resource to accomplish the goal.

11. The method of claim 10, wherein the asset is a software application adapted to be executed on a computer system, and wherein a computation of the expense function utilizes data derived from the group consisting of a time monitoring tool within the application, a time monitoring tool within an operating system that executes the application on the computer system, an analysis of logs generated by the application, an analysis of logs generated by the operating system, and combinations thereof.

12. The method of claim 1, wherein the business entity further comprises a beneficiary entity that has transferred financial value to the development component to develop the asset, and wherein the at least one compensator comprises the beneficiary component.

13. The method of claim 1, wherein the resource consists essentially of the asset, and wherein the at least one compensator comprises the development component.

14. The method of claim 1, wherein a portion of the compensation paid to the user component by each compensator of the at least one compensator is a function of an extent to which each compensator contributed to the usage burden.

15. The method of claim 1, wherein a portion of the compensation paid to the user component by a first compensator of the at least one compensator is a not function of an extent to which the first compensator caused the usage burden.

16. The method of claim 1, wherein the asset is a new asset that replaces a previous asset, and wherein the predetermined reference resource comprises the previous asset.

17. A method for managing a usage cost of a resource, said method comprising:
accessing, via a processor of a computer system, the resource by a user component of a first business entity after the asset has been developed by a development component of a second business entity, wherein the resource consists essentially of the asset or both the asset and a service, wherein the service supports usage of the asset and is provided by a service provider, and wherein if the resource consists essentially of the asset and the service then said accessing comprises accessing the service from the service provider; and
receiving compensation by the first business entity from the second business entity in response to the user component having incurred a usage burden from using the resource, wherein the usage burden is an expense of using the resource in excess of an expense of using a predetermined reference resource, wherein the compensation has a magnitude that is a function of the usage burden, and wherein the expense of using the resource is an expense function of an amount of time spent in using the resource to accomplish a goal in excess of an amount of time that was spent or would be spent in using the reference resource to accomplish the goal.

18. The method of claim 17, wherein the resource consists essentially of the asset and the service.

19. The method of claim 18, wherein said accessing comprises accessing the asset from the service provider.

20. The method of claim 17, wherein the resource consists essentially of the asset.

21. The method of claim 17, wherein said accessing comprises accessing the asset from the second business entity.

22. The method of claim 17, wherein the asset is a new asset that replaces a previous asset, and wherein the predetermined reference resource comprises the previous asset.

23. A method for managing a usage cost of a resource, said method comprising:
providing access via a processor of a computer system, by a second business entity, of the resource to a user component of a first business entity after the asset has been developed by a development component of the second business entity, wherein the resource consists essentially of the asset or both the asset and a service, wherein the service supports usage of the asset and is provided by a service provider comprised by the second business entity, and wherein if the resource consists essentially of the asset and the service then said providing access comprises providing access to the service by the service provider; and
providing compensation to the first business entity from the second business entity in response to the user component having incurred a usage burden from using the resource, wherein the usage burden is an expense of using the resource in excess of an expense of using a predetermined reference resource, wherein the compensation has a magnitude that is a function of the usage burden, and wherein the expense of using the resource is an expense function of an amount of time spent in using the resource to accomplish a goal in excess of an amount of time that was spent or would be spent in using the reference resource to accomplish the goal.

24. The method of claim 23, wherein the resource consists essentially of the asset.

25. The method of claim 23, wherein the resource consists essentially of the asset and the service.

26. The method of claim 23, wherein the asset is a new asset that replaces a previous asset, and wherein the predetermined reference resource comprises the previous asset.

27. A method comprising receiving compensation, via a processor of a computer system, by a user of a software application in response to the user having incurred a usage burden from prior use of the software application by the user, said compensation being received from a party that contributed to the usage burden, wherein the software application is a new software application that replaces a previous software application that had been used by the user prior to being replaced by the new software application, wherein the usage burden is an extra cost consisting of the difference between the total cost of using the new software application and the total cost of using the previous software application, and wherein the compensation has a magnitude that is a function of the usage burden.

28. The method of claim 27, wherein the party is a developer that developed the software application.

29. The method of claim 27, wherein the extra cost is a function of an amount of time spent in using the new software application to accomplish a goal in excess of an amount of time that was spent or would be spent in using the previous software application to accomplish the goal.

30. The method of claim 27, wherein the party is a service provider that provided a service supporting usage of the software application by the user.

31. A method comprising providing compensation, via a processor of a computer system, to a user of a software application in response to the user having incurred a usage burden from prior use of the software application by the user, said compensation being provided by a party that contributed to the usage burden, wherein the software application is a new software application that replaces a previous software application that had been used by the user prior to being replaced by the new software application, wherein the usage burden is an extra cost consisting of the difference between the total cost of using the new software application and the total cost of using the previous software application, and wherein the compensation has a magnitude that is a function of the usage burden.

32. The method of claim 31, wherein the party is a developer that developed the software application.

33. The method of claim 31, wherein the party is a service provider that provided a service supporting usage of the software application by the user.

\* \* \* \* \*